(12) United States Patent
Miyairi et al.

(10) Patent No.: US 12,121,886 B2
(45) Date of Patent: Oct. 22, 2024

(54) HONEYCOMB STRUCTURE AND EXHAUST GAS PURIFYING DEVICE

(71) Applicant: NGK INSULATORS, LTD., Nagoya (JP)

(72) Inventors: Yukio Miyairi, Nagoya (JP); Masaaki Masuda, Nagoya (JP); Kyohei Kato, Nagoya (JP); Kazuya Hosoda, Nagoya (JP); Takafumi Kimata, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 522 days.

(21) Appl. No.: 17/443,118

(22) Filed: Jul. 21, 2021

(65) Prior Publication Data

US 2021/0346880 A1 Nov. 11, 2021

Related U.S. Application Data

(63) Continuation of application No. PCT/JP2020/002855, filed on Jan. 27, 2020.

(30) Foreign Application Priority Data

Mar. 22, 2019 (JP) .................................. 2019-055632

(51) Int. Cl.
*B01J 35/56* (2024.01)
*B01D 53/88* (2006.01)
(Continued)

(52) U.S. Cl.
CPC ............ *B01J 35/56* (2024.01); *B01D 53/885* (2013.01); *B01J 35/33* (2024.01); *B01J 37/0009* (2013.01);
(Continued)

(58) Field of Classification Search
CPC .... B01J 35/04; B01J 35/0033; B01J 37/0009; B01J 35/023; B01J 35/0013;
(Continued)

(56) References Cited

U.S. PATENT DOCUMENTS 5,098,455 A * 3/1992 Doty .................... C04B 35/185
428/116
5,198,007 A * 3/1993 Moyer ............... B01D 39/2075
55/DIG. 30
(Continued)

FOREIGN PATENT DOCUMENTS

JP 2004-342540 A 12/2004
JP 2006-057584 A 3/2006
(Continued)

OTHER PUBLICATIONS

Epo translation of WO-2016021186-A1 (Year: 2016).*
(Continued)

*Primary Examiner* — Stephen Hobson
(74) *Attorney, Agent, or Firm* — BURR PATENT LAW, PLLC

(57) ABSTRACT

A pillar shaped honeycomb structure, including: an outer peripheral wall; and a porous partition wall disposed inside the outer peripheral wall, the partition wall defining a plurality of cells, each of the cells extending from one end face to other end face to form a flow path, wherein the plurality of cells include two or more types of magnetic substances in which at least two of a maximum magnetic permeability, a Curie point, and an intrinsic resistance value are different.

13 Claims, 12 Drawing Sheets

(51) Int. Cl.
*B01J 35/33* (2024.01)
*B01J 37/00* (2006.01)
*C04B 38/00* (2006.01)
*F01N 3/20* (2006.01)

(52) U.S. Cl.
CPC .... *C04B 38/0009* (2013.01); *B01D 2255/915* (2013.01); *F01N 3/2013* (2013.01)

(58) Field of Classification Search
CPC ............ B01D 53/885; B01D 2255/915; C04B 38/0009; F01N 3/2013
See application file for complete search history.

(56) References Cited

U.S. PATENT DOCUMENTS

| | | | | |
|---|---|---|---|---|
| 5,720,787 | A * | 2/1998 | Kasai | F01N 3/0222 55/282 |
| 5,863,311 | A * | 1/1999 | Nagai | B01D 46/247 55/525 |
| 5,908,480 | A * | 6/1999 | Ban | F01N 3/0226 55/482 |
| 6,090,187 | A * | 7/2000 | Kumagai | F01N 13/0097 60/303 |
| 6,669,751 | B1 * | 12/2003 | Ohno | B01D 46/2429 55/483 |
| 7,722,705 | B2 * | 5/2010 | Gadkaree | B01D 53/06 95/134 |
| 7,927,393 | B2 * | 4/2011 | Sanami | B01D 46/527 55/502 |
| 7,981,375 | B2 * | 7/2011 | Ramberg | B01J 20/0218 264/630 |
| 9,981,881 | B2 * | 5/2018 | Noguchi | C04B 38/0012 |
| 10,814,266 | B2 * | 10/2020 | Kato | B01D 46/00 |
| 10,830,113 | B2 * | 11/2020 | Nagai | F01N 3/0222 |
| 10,850,223 | B2 * | 12/2020 | Miyairi | B01D 46/2455 |
| 10,857,498 | B2 * | 12/2020 | Miyairi | F01N 3/0222 |
| 11,786,849 | B2 * | 10/2023 | Trask | B01F 25/50 210/172.1 |
| 2003/0086839 | A1 * | 5/2003 | Rivin | H01M 8/04225 422/186.01 |
| 2003/0175196 | A1 * | 9/2003 | Blackwell | B01J 19/087 423/376 |
| 2005/0196586 | A1 * | 9/2005 | Shimodaira | C04B 41/89 428/116 |
| 2007/0190631 | A1 * | 8/2007 | Kreutzer | B01J 19/2485 435/183 |
| 2009/0031855 | A1 * | 2/2009 | Ramberg | B01D 39/2062 423/210 |
| 2010/0135866 | A1 * | 6/2010 | Mizuno | B01D 46/2482 264/630 |
| 2011/0203242 | A1 * | 8/2011 | Goto | B01D 46/2484 55/523 |
| 2011/0262639 | A1 * | 10/2011 | Sato | C04B 41/009 427/181 |
| 2015/0152768 | A1 * | 6/2015 | Arulraj | B01J 29/46 428/117 |
| 2017/0014763 | A1 * | 1/2017 | Crawford | F01N 3/2013 |
| 2017/0022868 | A1 * | 1/2017 | Crawford | B01D 53/94 |
| 2017/0218823 | A1 * | 8/2017 | Crawford | F01N 3/2013 |
| 2017/0276280 | A1 * | 9/2017 | Kobayashi | C04B 37/025 |
| 2019/0003363 | A1 * | 1/2019 | Crawford | B01D 53/9431 |
| 2019/0070596 | A1 * | 3/2019 | Yang | B01D 53/9422 |
| 2021/0115825 | A1 * | 4/2021 | Miyairi | B01D 46/42 |
| 2021/0322947 | A1 * | 10/2021 | Mizukami | C04B 38/0006 |
| 2023/0321643 | A1 * | 10/2023 | Ichikawa | B01D 46/2429 502/439 |
| 2023/0356198 | A1 * | 11/2023 | Caudle | F01N 3/106 |
| 2023/0358156 | A1 * | 11/2023 | Grace | F01N 3/2839 |

FOREIGN PATENT DOCUMENTS

| | | | | |
|---|---|---|---|---|
| JP | 2016-187766 A | | 11/2016 | |
| WO | WO-2016021186 A1 | * | 2/2016 | ............. B01J 35/02 |
| WO | WO-2017195107 A2 | * | 11/2017 | ............. B01D 53/86 |

OTHER PUBLICATIONS

Jacobs et al. "Raising the Curie point in the iron-cobalt-(aluminum) system" Journal of Applied Physics vol. 69 pp. 5924-5926 published Apr. 15, 1991 (Year: 1991).*

International Search Report and Written Opinion (Application No. PCT/JP2020/002855) dated Mar. 24, 2020.

English translation of the International Preliminary Report on Patentability (Chapter I) dated Oct. 7, 2021 (Application No. PCT/JP2020/002855).

* cited by examiner

HONEYCOMB STRUCTURE AND EXHAUST GAS PURIFYING DEVICE

FIELD OF THE INVENTION

The present invention relates to a honeycomb structure and an exhaust gas purifying device. More particularly, it relates to a honeycomb structure and an exhaust gas purifying device, which has short periods of times required for heating to a temperature at which water vaporizes and for heating to a catalyst activation temperature when the catalyst is supported, and which can burn out and remove carbon fine particles by induction heating.

BACKGROUND OF THE INVENTION

Exhaust gases from motor vehicles typically contain harmful components such as carbon monoxide, hydrocarbons and nitrogen oxides and/or fine particles of carbon or the like as a result of incomplete combustion. From the viewpoint of reducing health hazards to a human body, there is an increasing need for reducing harmful gas components and fine particles in exhaust gases from motor vehicles.

However, at present, these harmful components are discharged during a period immediately after an engine is started, i.e., a period during which a catalyst temperature is lower and a catalytic activity is insufficient. Therefore, the harmful components in the exhaust gas may be discharged without being purified by the catalyst before reaching the catalyst activation temperature. In order to satisfy such a need, it is necessary to reduce emission as much as possible, which is discharged without being purified by a catalyst before reaching a catalytic activity temperature. For example, measures using an electric heating technique are known in the art.

As such an art, Patent Literature 1 proposes a technique for inserting a magnetic wire into a part of cells of a cordierite honeycomb widely used as a catalyst supported honeycomb. According to this technique, a current can be passed through the coil on an outer circumference of the honeycomb to increase a wire temperature by induction heating, and its heat can increase a temperature of the honeycomb.

Exhaust carbon fine particles from diesel engines and gasoline engines are affected on human health, so that there is also an increased need for reduction of those fine particles. For such exhaust gas processing, wall-flow type filters of honeycomb structures which are alternately provided with plugged portions are used. The carbon fine particles (soot) collected by the filters are burned out and removed by increasing a temperature of the exhaust gas. However, if a time required for the burning and removal is longer, there causes a problem that consumption of a fuel required for increasing the temperature of the exhaust gas increases. Further, it is preferable to mount the filter at an underfloor position having a relatively large space from the viewpoint of ensuring a mounting space, in terms of ensuring a degree of freedom in a design for forming an exhaust system. However, if it is placed at the underfloor position, a temperature of an exhaust gas from an engine is decreased, which causes a problem that the carbon fine particles cannot be burn out and removed.

To address this problem, Patent Literature 2 discloses a technique for dispersedly arranging magnetic fine particles on surfaces of partition walls of a filter and heating them by electromagnetic induction heating. Further, Patent Literature 3 discloses a technique for inserting a magnetic wire into plugged portions of a filter.

CITATION LIST

Patent Literatures

[Patent Literature 1] U.S. Patent Application Publication No. 2017/0022868 A1
[Patent Literature 2] WO 2016/021186 A1
[Patent Literature 3] U.S. Patent Application Publication No. 2017/0014763 A1

SUMMARY OF THE INVENTION

When a piping is installed under the floor of the vehicle, condensed water generated by driving the engine is accumulated, and the exhaust gas filter also contains a lot of water. As described above, the exhaust gas filter containing a large amount of water also requires vaporization heat of water in order to heat the catalyst to the catalyst activation temperature, and it also requires a longer period of time to reach the catalyst activation temperature.

Further, even if the filter can be heated to a temperature at which water vaporizes (about 100° C.) in a short period of time, good exhaust gas processing cannot be carried out if the filter cannot be heated to a temperature exceeding that vaporization temperature, further to a temperature at which carbon fine particles and the like are well burn out.

In view of the above circumstances, an object of the present invention is to provide a honeycomb structure and an exhaust gas purifying device, which has short periods of times required for heating to a temperature at which water vaporizes and for heating to a catalyst activation temperature when the catalyst is supported, and which can burn out and remove carbon fine particles by induction heating.

As a result of intensive studies, the present inventors have found that the above problems can be solved by configuring a honeycomb structure such that two or more types of magnetic substances in which at least two of a maximum magnetic permeability, a Curie point, and an intrinsic resistance value are different are provided in cells serving as flow paths for a fluid in the honeycomb structure. That is, the present invention is specified as follows:

(1) A pillar shaped honeycomb structure, comprising:
  an outer peripheral wall; and
  a porous partition wall disposed inside the outer peripheral wall, the partition wall defining a plurality of cells, each of the cells extending from one end face to other end face to form a flow path,
  wherein the plurality of cells include two or more types of magnetic substances in which at least two of a maximum magnetic permeability, a Curie point, and an intrinsic resistance value are different.

(2) An exhaust gas purifying device, comprising:
  the honeycomb structure according to (1);
  a coil wiring that spirally surrounds an outer circumference of the honeycomb structure; and
  a metal pipe for housing the honeycomb structure and the coil wiring.

According to the present invention, it is possible to provide a honeycomb structure and an exhaust gas purifying device, which has short periods of times required for heating to a temperature at which water vaporizes and for heating to a catalyst activation temperature when the catalyst is supported, and which can burn out and remove carbon fine particles by induction heating.

BRIEF DESCRIPTION OF THE DRAWINGS

FIG. 7 (a) is a cross-sectional view schematically showing a cross section of cells having plugged portions and partition walls of a honeycomb structure according to Embodiment 6 of the present invention, the cross section being parallel to an extending direction of the cells;

DETAILED DESCRIPTION OF THE INVENTION

Figure 1:
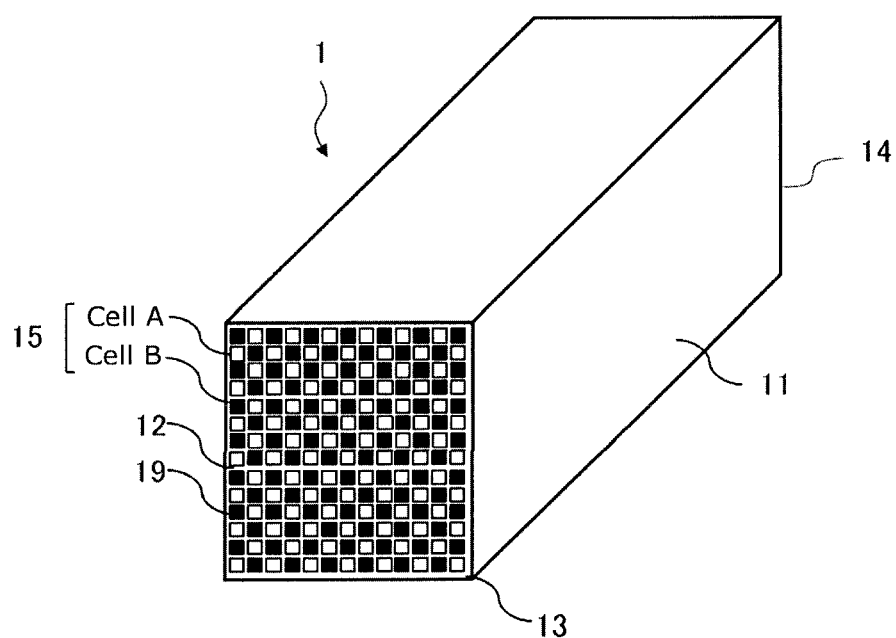
FIG. 1 is a perspective view schematically showing a honeycomb structure according to an embodiment of the present invention.

Hereinafter, embodiments of a honeycomb structure according to the present invention will be described with reference to the drawing. However, the present invention is not limited to these embodiments, and various changes, modifications, and improvements may be made based on knowledge of those skilled in the art, without departing from the scope of the present invention.

<1. Honeycomb Structure>

FIG. 1 shows a perspective view schematically illustrating a honeycomb structure 1 according to an embodiment of the present invention. The honeycomb structure 1 is pillar-shaped and has an outer peripheral wall 11 and porous partition walls 12 which are arranged inside the outer peripheral wall 11 and define a plurality of cells 15 that extends from one end face 13 to the other end face 14 to form flow paths. In the illustrated honeycomb structure 1, the cells 15 include: a plurality of cells A which are opened on the one end face 13 side and have plugged portions 19 on the other end face 14; and a plurality of cells B which are arranged alternately with the cells A, and which are opened on the other end face 14 side and have plugged portions 19 on the one end face 13. The cells A and the cells B are alternately arranged so as to be adjacent to each other via the partition walls 12, and both end faces form a checkered pattern. The numbers, arrangements, shapes and the like of the cells A and B, as well as the thickness of the partition walls 12, and the like, are not limited, and may be appropriately designed as needed. The honeycomb structure 1 can be used as a filter (honeycomb filter) for purifying an exhaust gas. The honeycomb structure 1 as described above has a structure in which plugged portions 19 are provided in the cells 15, although not limited thereto. That is, when the honeycomb structure according to the present invention is not used as the honeycomb filter, the plugged portions 19 may not be provided.

The honeycomb structure 1 contains two or more types of magnetic substances in the cells 15. As will be described later, the honeycomb structure 1 can present various embodiments depending on arrangement and shape of the two or more types of magnetic substances in the cells 15. Hereinafter, each embodiment will be described in detail.

Embodiment 1

Figure 2A:
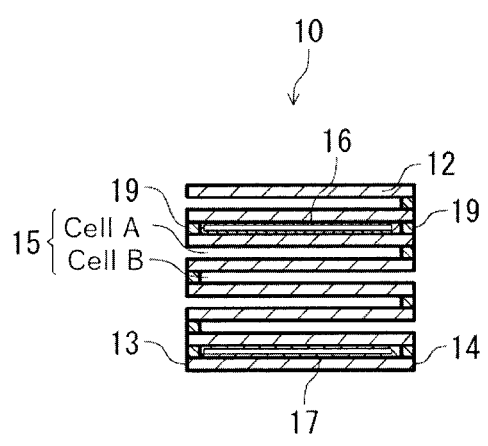
FIG. 2 (a) is a cross-sectional view schematically showing a cross section of cells having plugged portions and partition walls of a honeycomb structure according to Embodiment 1 of the present invention, the cross section being parallel to an extending direction of the cells.
FIG. 2(b) is a cross-sectional view schematically showing a cross section of cells having plugged portions and partition walls of a honeycomb structure according to Embodiment 1 of the present invention, the cross section being perpendicular to an extending direction of the cells.
Figure 2B:
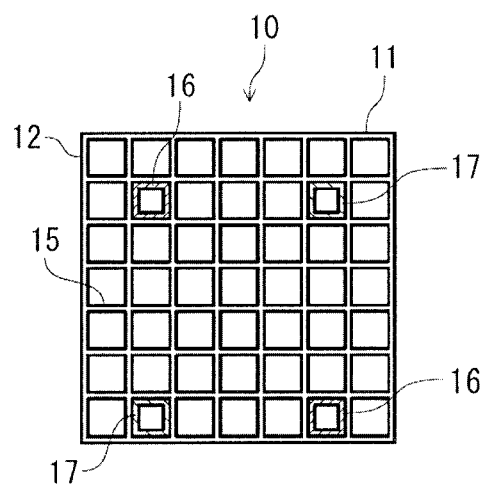

FIG. 2 (a) is a cross-sectional view schematically showing a cross section of cells 15 having plugged portions 19 and partition walls 12 of a honeycomb structure 10 according to Embodiment 1 of the present invention, the cross section being parallel to an extending direction of the cells 15. FIG. 2(b) is a cross-sectional view schematically showing a cross section of the cells 15 having the plugged portions 19 and the partition walls 12 of the honeycomb structure 10 according to Embodiment 1 of the present invention, the cross section being perpendicular to an extending direction of the cells.

The honeycomb structure 10 contains two types of magnetic substances 16, 17 in different cells 15. The magnetic substances 16, 17 of the honeycomb structure 10 are not particularly limited as long as they are of two or more types, and three types, four types, or five or more types of the magnetic substances may be contained in different cells 15.

In FIG. 2, each of the magnetic substances 16, 17 is provided so as to coat surfaces of the partition walls 12 in the cells 15. Each of the magnetic substances 16 and 17 may be filled so as to fill the entire space in the cell 15. The cells 15 provided with the magnetic substances 16, 17 are provided with plugged portions 19 on both of one end face 13 and the other end face 14 of the honeycomb structure 10. The plugged portions 19 may employ those formed in the same manner as in the plugged portions of the conventionally known honeycomb structure. When the magnetic substances 16, 17 are filled in the cells 15, the plugged portions 19 may not be provided.

Positions of the cells 15 where the magnetic substances 16, 17 are provided are not particularly limited. However, since the magnetic substance 16 and the magnetic substance 17 have different functions as described later, the cells 15 respectively having the magnetic substances 16,17 are preferably provided in order. For example, in the cross section perpendicular to the extending direction of the cells 15, it is preferable that the cell 15 provided with the magnetic substance 16 and the cell 15 provided with the magnetic substance 17 are alternately provided in the vertical direction and the horizontal direction, respectively. Further, the cell 15 provided with the magnetic substance 16 and the cell 15 provided with the magnetic substance 17 may be provided adjacent to each other or may be provided apart from each other. The position or number of the cells 15 provided with the magnetic substance 16 and the cells 15 provided with the magnetic substance 17 can be appropriately designed in view of a heating efficiency and a pressure loss of the honeycomb structure 10.

The two types of magnetic substances 16, 17 are provided in different cells 15, and they are different from each other in at least two of a maximum magnetic permeability, a Curie point, and an intrinsic resistance value. The differences in the maximum magnetic permeability, the Curie point, and the intrinsic resistance value between the magnetic substances 16, 17 have different effects on a temperature rise of the honeycomb structure 10 during heating and the like, as will be described later. For example, the adjustment of the maximum magnetic permeabilities of the magnetic substances 16, 17 can accelerate a time to reach a rising rate of a temperature of the honeycomb structure 10 at the time of starting an engine, particularly a temperature at which water vaporizes (about 100° C.), and further a higher temperature at which a catalyst can be activated (about 300° C.). Further, the adjustment of the Curie points of the magnetic substances 16, 17 can allow the honeycomb structure 10 to be heated to a higher temperature at which carbon fine particles and the like are well burned out. Furthermore, the adjustment of the intrinsic resistance values of the magnetic substances 16, 17 can allow a heat value to be controlled. That is, the honeycomb structure 10 is configured such that two types of magnetic substances 16, 17 are provided in different cells 15 and they are different from each other in at least two of the maximum magnetic permeability, the Curie point, and the intrinsic resistance value, whereby in one honeycomb structure 10, a temperature can be raised to a temperature at which water vaporizes (about 100° C.) at an early stage in a certain part, and a temperature can be raised to a higher temperature at which carbon fine particles and the like are well burned out in a certain part, and a temperature can be raised to a catalyst activation temperature at an early stage in a certain part. Therefore, a time required for heating the entire honeycomb structure 10 to a temperature at which water evaporates is short, and the carbon fine particles and the like can be burn out and removed by induction heating. Further, in the case of a filter with a catalyst supported, a time required for catalytic activity can be shortened, and an energy for raising the temperature to a PM oxidation temperature by the heat of the catalytic reaction can also be reduced.

As described above, the magnetic substances 16, 17 are different from each other in at least two of the maximum magnetic permeability, the Curie point, and the intrinsic resistance value, even if the magnetic substances are of three types, four types, five types or more. Specifically, for example, when three types of magnetic substances a, b, and c are provided, the magnetic substance a and the magnetic substance b are different from each other in at least two of the maximum magnetic permeability, the Curie point, and the intrinsic resistance value. Further, the magnetic substance b and the magnetic substance c are different from each other in at least two of the maximum magnetic permeability, the Curie point, and the intrinsic resistance value. Furthermore, the magnetic substance c and the magnetic substance a are different from each other in at least two of the maximum magnetic permeability, the Curie point, and the intrinsic resistance value.

The magnetic substances 16, 17 are magnetic materials and are magnetized by a magnetic field, and a state of magnetization varies depending on the strength of the magnetic field. This is represented by a "magnetization curve". The magnetization curve may have a magnetic field H on a horizontal axis and a magnetic flux density B on a vertical axis (B-H curve). A state where no magnetic field is applied to the magnetic substance refers to a degaussing state, which is represented by an origin O. As a magnetic field is applied, a curve in which the magnetic flux density increases from the origin O to a saturated state is drawn. This curve is an "initial magnetization curve". A slope of a straight line connecting a point on the initial magnetization curve to the origin is a "permeability". The permeability indicates an ease of magnetization of the magnetic substance in such a sense that the magnetic field permeates. The magnetic permeability near the origin where the magnetic field is smaller is an "initial magnetic permeability", and a magnetic permeability that is maximum on the initial magnetization curve is a "maximum magnetic permeability".

At least one of the magnetic substances 16, 17 preferably has a maximum magnetic permeability of 10,000 or more. According to such a configuration, when the honeycomb structure 10 having the magnetic substances 16, 17 is dielectrically heated, the temperature can be raised in a short period of time until a temperature at which water vaporizes (about 100° C.), and further until a temperature at which the catalyst is activated (about 300° C.). At least one of the magnetic substances 16, 17 may more preferably have a maximum magnetic permeability of 25,000 or more, and even more preferably a maximum magnetic permeability of 50,000 or more. Examples of the magnetic substance having a maximum magnetic permeability of 10,000 or more include the balance Fe-10% by mass of Si-5% by mass of Al, 49% by mass of Co-49% by mass of Fe-2% by mass of V, and the balance Fe-36% by mass of Ni, the balance Fe-45% by mass of Ni, and the like.

At least one of the magnetic substances 16, 17 preferably has a Curie point of 700° C. or more. The Curie point of the magnetic substances 16, 17 of 700° C. or more can enable a honeycomb temperature sufficient to increase the catalyst temperature to the catalyst activation temperature or more to be reached, as well as this can lead to ease to burn out and remove PMs (particulate matters) collected in the first cells 15 to regenerate a honeycomb structure filter. The magnetic substances having a curry point of 700° C. or more include, for example, the balance Co-20% by mass of Fe; the balance Co-25% by mass of Ni-4% by mass of Fe; the balance Fe-15-35% by mass of Co; the balance Fe-17% by mass of Co-2% by mass of Cr-1% by mass of Mo; the balance Fe-49% by mass of Co-2% by mass of V; the balance Fe-18% by mass of Co-10% by mass of Cr-2% by mass of Mo-1% by mass of Al; the balance Fe-27% by mass of Co-1% by mass of Nb; the balance Fe-20% by mass of Co-1% by mass of Cr-2% by mass of V; the balance Fe-35% by mass of Co-1% by mass of Cr; pure cobalt; pure iron; electromagnetic soft iron; the balance Fe-0.1-0.5% by mass of Mn; the balance Fe-3% by mass Si; and the like. Here, the Curie point of the magnetic substance refers to a temperature at which a ferromagnetic property is lost.

At least one of the magnetic substances 16, 17 preferably has an intrinsic resistance value of 50 μΩcm or more at 25° C. According to such a configuration, an amount of heat generated by induction heating can be further increased. Examples of the magnetic substances having an intrinsic resistance value of 50 μΩcm or more at 25° C. include the balance Fe-18% by mass of Cr; the balance Fe-13% by mass of Cr-2% by mass of Si; the balance Fe-20% by mass of Cr-2% by mass of Si-2% by mass of Mo; the balance Fe-10% by mass of Si-5% by mass of Al; the balance Fe-18% by mass of Co-10% by mass of Cr-2% by mass of Mo-1% by mass of Al; the balance Fe-36% by mass of Ni; the balance Fe-45 by mass of Ni; and the like.

At least one of the magnetic substances 16, 17 preferably has a coercive force of 100 Nm or more. According to such a configuration, when the honeycomb structure 10 having the magnetic substances 16, 17 is dielectrically heated, the temperature can be raised in a short period of time until a temperature at which water vaporizes (about 100° C.), and further until a temperature at which the catalyst is activated (about 300° C.). The magnetic substances having a coercive force of 100 A/m or more include the balance Fe-35% by mass of Co; the balance Fe-20% by mass of Co-1% by mass of V; the balance Fe-13% by mass of Cr-2% by mass of Si; the balance Fe-18% by mass of Cr; and the like. The combination of the magnetic substance having the intrinsic resistance value of 50 μΩcm or more with the magnetic substance having the higher Curie point can lead to rapid initial temperature rise and higher maximum reached temperature, which would be more preferable.

Although materials of the partition walls 12 and the outer peripheral wall 11 of the honeycomb structure 10 are not particularly limited, the honeycomb structure is required to be a porous body having a large number of pores. Therefore, the honeycomb structure 10 is typically formed of a ceramic material. Examples of the ceramic material include a sintered body of ceramics comprised of cordierite, silicon carbide, aluminum titanate, silicon nitride, mullite, alumina, a silicon-silicon carbide-based composite material, or silicon carbide-cordierite based composite material, in particular, a sintered body mainly based on a silicon-silicon carbide composite material or silicon carbide. As used herein, the expression "silicon carbide-based" means that the honeycomb structure 10 contains silicon carbide in an amount of 50% by mass or more of the entire honeycomb structure 10. The phrase "the honeycomb structure 10 is mainly based on a silicon-silicon carbide composite material" means that the honeycomb structure 10 contains 90% by mass or more of the silicon-silicon carbide composite material (total mass) based on the entire honeycomb structure 10. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the honeycomb structure 10 is mainly based on silicon carbide" means that the honeycomb structure 10 contains 90% by mass or more of silicon carbide (total mass) based on the entire honeycomb structure 10.

Preferably, the honeycomb structure 10 is formed of at least one ceramic material selected from the group comprising cordierite, silicon carbide, aluminum titanate, silicon nitride, mullite, or alumina.

The cell shape of the honeycomb structure 10 may be, but not particularly limited to, a polygonal shape such as a triangle, a quadrangle, a pentagon, a hexagon and an octagon; a circular shape; or an ellipse shape, in a cross section orthogonal to the central axis of the honeycomb structure 10.

Further, an outer shape of the honeycomb structure 10 may be, but not particularly limited to, a shape such as a pillar shape with circular end faces (cylindrical shape), a pillar shape with oval end faces, and a pillar shape with polygonal (square, pentagonal, hexagonal, heptagonal, octagonal, and the like) end faces, and the like. Furthermore, the size of the honeycomb structure 10 is not particularly limited, and an axial length of the honeycomb structure is preferably from 40 to 500 mm. Further, for example, when the outer shape of the honeycomb structure 10 is cylindrical, a radius of each end face is preferably from 50 to 500 mm.

The partition walls 12 of the honeycomb structure 10 preferably have a thickness of from 0.10 to 0.50 mm, and more preferably from 0.25 to 0.45 mm, in terms of ease of production. For example, the thickness of 0.20 mm or more improves the strength of the honeycomb structure 10. The thickness of 0.50 mm or less can result in lower pressure loss when the honeycomb structure 10 is used as a filter. It should be noted that the thickness of the partition walls 12 is an average value measured by a method for observing the axial cross section with a microscope.

Further, the partition walls 12 forming the honeycomb structure 10 preferably have a porosity of from 30 to 70%, and more preferably from 40 to 65%, in terms of ease of production. The porosity of 30% or more tends to decrease a pressure loss. The porosity of 70% or less can maintain the strength of the honeycomb structure 10.

The porous partition walls 12 preferably have an average pore size of from 5 to 30 μm, and more preferably from 10 to 25 μm. The average pore size of 5 μm or more can decrease the pressure loss when the honeycomb structure 10 is used as a filter. The average pore size of 30 μm or less can maintain the strength of the honeycomb structure 10. As used herein, the terms "average pore diameter" and "porosity" mean an average pore diameter and a porosity measured by mercury porosimetry, respectively.

The honeycomb structure 10 preferably has a cell density in a range of from 5 to 93 cells/cm$^2$, and more preferably 5 to 63 cells/cm$^2$, and even more preferably in a range of from 31 to 54 cells/cm$^2$, although not particularly limited thereto.

Such a honeycomb structure 10 is produced by forming a green body containing a ceramic raw material into a honeycomb shape having partition walls 12 that extend from one end face to other end face and define a plurality of cells 15 to form flow paths for a fluid, to form a honeycomb formed body, and drying the honeycomb formed body and then firing it. When such a honeycomb structure is used as the honeycomb structure 10 according to the present embodiment, the outer peripheral wall may be integrally extruded with a honeycomb structure portion, which is used as the outer peripheral wall as it is, or an outer circumference of the honeycomb formed body (honeycomb structure) may be ground and shaped into a predetermined shape after forming or firing it, and a coating material may be applied to the outer circumference-ground honeycomb structure to form an outer peripheral coating. In the honeycomb structure 10 of this embodiment, for example, a honeycomb structure having an outer circumference without grinding the outermost circumference of the honeycomb structure may be used, and the coating material may be further applied onto the outer peripheral surface of the honeycomb structure having the outer circumference (that is, a further outer side of the outer circumference of the honeycomb structure) to form the outer coating. That is, in the former case, only the outer peripheral coating made of the coating material forms the outer peripheral surface positioned on the outermost circumference. On the other hand, in the latter case, an outer peripheral wall having a two-layered structure positioned on the outermost periphery is formed in which the outer peripheral coating made of the coating material is further laminated on the outer peripheral surface of the honeycomb structure. The outer peripheral wall may be extruded integrally with the honeycomb structure portion and fired as it is, which may be used as the outer peripheral wall without processing the outer circumference.

A composition of the coating material is not particularly limited, and various known coating materials can be appropriately used. The coating material may further contain colloidal silica, an organic binder, clay and the like. The organic binder is preferably used in an amount of from 0.05 to 0.5% by mass, and more preferably from 0.1 to 0.2% by mass. Further, the clay is preferably used in an amount of from 0.2 to 2.0% by mass, and more preferably from 0.4 to 0.8% by mass.

The honeycomb structure 10 is not limited to an integral type honeycomb structure 10 in which the partition walls 12 are integrally formed. For example, the honeycomb structure 10 may be a honeycomb structure 10 in which pillar shaped honeycomb segments each having a plurality of cells 15 defined by porous partition walls 12 to form flow paths for a fluid are combined via joining material layers (which, hereinafter, may be referred to as a "joined honeycomb structure").

The honeycomb structure 10 according to the present embodiment may have a catalyst supported on the surfaces of the porous partition walls 12 that form inner walls of the cells 15 and/or in pores of the partition walls 12. Thus, the honeycomb structure 10 according to the present embodiment may be structured as a catalyst support having a supported catalyst, and as a filter (for example, a diesel particulate filter (hereinafter also referred to as "DPF") including the plugged portions 19 for purifying particulate matters (carbon fine particles) in an exhaust gas.

A type of the catalyst is not particularly limited, and it can be appropriately selected according to the use purposes and applications of the honeycomb structure 10. Examples of the catalyst include noble metal catalysts or other catalysts. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (LNT catalyst) containing an alkaline earth metal and platinum as storage components for nitrogen oxides ($NO_x$). Illustrative examples of a catalyst that does not use the noble metal include a $NO_x$ selective catalytic reduction catalyst (SCR catalyst) containing a copper-substituted or iron-substituted zeolite, and the like. Also, two or more catalysts selected from the group consisting of those catalysts may be used. A method for supporting the catalyst is not particularly limited, and it can be carried out according to a conventional method for supporting the catalyst on the honeycomb structure.

Using each of fired honeycomb structures as a honeycomb segment, the side faces of the plurality of honeycomb segments can be joined with a joining material so as to be integrated to provide a honeycomb structure in which the honeycomb segments are joined. For example, the honeycomb structure in which the honeycomb segments are joined can be produced as follows. The joining material is applied to joining surfaces (side surfaces) of each honeycomb segment while attaching joining material adhesion preventing masks to both end faces of each honeycomb segment.

These honeycomb segments are then arranged adjacent to each other such that the side surfaces of the honeycomb segments are opposed to each other, and the adjacent honeycomb segments are pressure-bonded together, and then heated and dried. Thus, the honeycomb structure in which the side surfaces of the adjacent honeycomb segments are joined with the joining material is produced. For the honeycomb structure, the outer peripheral portion may be ground into a desired shape (for example, a pillar shape), and the coating material may be applied to the outer peripheral surface, and then heated and dried to form an outer peripheral wall 11.

The material of the joining material adhesion preventing mask that can be suitably used includes, but not particularly limited to, synthetic resins such as polypropylene (PP), polyethylene terephthalate (PET), polyimide, Teflon (registered trademark) and the like. Further, the mask is preferably provided with an adhesive layer, and the material of the adhesive layer is preferably an acrylic resin, a rubber (for example, a rubber mainly based on a natural rubber or a synthetic rubber), or a silicon resin.

Examples of the joining material adhesion preventing mask that can be suitable used include a pressure sensitive adhesive film having a thickness of from 20 to 50 μm.

The joining material that can be used may be prepared by, for example, mixing ceramic powder, a dispersion medium (for example, water or the like), and optionally additives such as a binder, a deflocculant and a foaming resin. The ceramics may be preferably ceramics containing at least one selected from the group consisting of cordierite, mullite, zircon, aluminum titanate, silicon carbide, silicon nitride, zirconia, spinel, indialite, sapphirine, corundum, and titania, and more preferably having the same material as that of the honeycomb structure. The binder includes polyvinyl alcohol, methyl cellulose, CMC (carboxymethyl cellulose) and the like.

The honeycomb structure 10 may have surface layers having permeability on at least a part of the surfaces of the partition walls 12. As used herein, "permeability" means that a permeability of each surface layer is $1.0 \times 10^{-13}$ m² or more. From the viewpoint of further reducing the pressure loss, the permeability is preferably $1.0 \times 10^{-12}$ m² or more. Since each surface layer has the permeability, the pressure loss of the honeycomb structure 10 caused by the surface layers can be suppressed.

Further, as used herein, the "permeability" refers to a physical property value calculated by the following equation (1), which value is an index indicating passing resistance when a certain gas passes through an object (partition wall 12). Here, in the following equation (1), C represents a permeability (m²), F represents a gas flow rate (cm³/s), T represents a thickness of a sample (cm), V represents a gas viscosity (dynes·sec/cm²), D represents a diameter of a sample (cm), P represents a gas pressure (PSI). The numerical values in the following equation (1) are: 13.839 (PSI)=1 (atm) and 68947.6 (dynes·sec/cm²)=1 (PSI).

[Equation 1]

$$C = \frac{8FTV}{\pi D^2 (P^3 - 13.839^2)/13.839 \times 68947.6} \times 10^{-4} \quad (1)$$

When measuring the permeability, the partition walls 12 with the surface layers are cut out, the permeability is measured on the partition walls 12 with the surface layers, and the permeability is then measured on the partition walls 12 from which the surface layers have been removed. From a ratio of thicknesses of the surface layer and the partition wall and the permeability measurement results, the permeability of the surface layers is calculated.

The surface layers preferably have a porosity of 50% or more, and more preferably 60% or more, and still more preferably 70% or more. By having the porosity of 50% or more, the pressure loss can be suppressed. However, if the porosity is too high, the surface layers become brittle and easily peels off. Therefore, the porosity is preferably 90% or less.

As a method of measuring the porosity of the surface layers by the mercury press-in method, a difference between a mercury porosity curve of a sample having a substrate and surface layers and a mercury porosity curve of only the substrate from which only the surface layers have been scrapped off and removed is determined to be a mercury porosity curve of the surface layers, and the porosity of the surface layers is calculated from the mass of the scraped surface layers and the mercury porosity curve. A SEM image may be taken, and the porosity of the surface layers may be calculated from an area ratio of the void portions and the solid portions by image analysis of the surface layer portions.

The surface layers preferably have an average pore diameter of 10 μm or less, and more preferably 5 μm or less, and further preferably 4 μm or less, and particularly preferably 3 μm or less. The average pore diameter of 10 μm or less can achieve a higher particle collection efficiency. However, if the average pore diameter of the surface layers is too low, the pressure loss will increase. Therefore, the average pore diameter is preferably 0.5 μm or more.

As a method of measuring the average pore diameter of the surface layers by the mercury press-in method, in the form of peak values in the mercury porosimeter, a difference between a mercury porosity curve (pore volume frequency) on the substrate on which the surface layers are formed and a mercury porosity curve on only the substrate from which only the surface layers have been scrapped off and removed is determined to be a mercury porosity curve of the surface layers, and its peak is determined to be the average pore diameter. Further, an SEM image of the cross section of the honeycomb structure 10 may be taken, and the surface layer portion may be subject to image analysis to binarize the void portions and the solid portions, and twenty or more voids may be randomly selected to average the inscribed circles, and the average may be determined to be the average pore diameter.

Further, the thickness of each surface layer is not particularly limited. However, in order to obtain the effect of the surface layers more remarkably, the thickness of each surface layer is preferably 10 μm or more. On the other hand, from the viewpoint of avoiding an increase in pressure loss, the thickness of each surface layer is preferably 80 μm or less. The thickness of each surface layer is more preferably 50 μm or less. For a method of measuring the thickness of each surface layer, for example, the honeycomb structure 10 on which the surface layers are formed is cut in a direction perpendicular to the cell extending direction, and the thickness of each surface layer is measured from the cross section of the honeycomb structure 10, and the measured thicknesses at arbitrary five points can be averaged.

Next, the method for producing the honeycomb structure 10 will be described. First, the honeycomb structure having the porous partition walls and the plurality of cells defined by the partition walls is produced. For example, when producing the honeycomb structure made of cordierite, a cordierite-forming raw material is firstly prepared. The cordierite-forming raw material contains a silica source component, a magnesia source component, and an alumina source component, and the like, in order to formulate each component so as to have a theoretical composition of cordierite. Among them, the silica source component that can be used includes preferably quartz and fused silica, and the particle diameter of the silica source component is preferably from 100 to 150 μm.

Examples of the magnesia source component include talc and magnesite. Among them, talc is preferred. The talc is preferably contained in an amount of from 37 to 43% by mass in the cordierite-forming raw material. The talc preferably has a particle diameter (average particle diameter) of from 5 to 50 μm, and more preferably from 10 to 40 μm. Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

A material for a green body to be added to the cordierite-forming raw material (additive) is then prepared. At least a binder and a pore former are used as additives. In addition to the binder and the pore former, a dispersant or a surfactant can be used.

The pore former that can be used includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used include at least one metal selected from the group consisting of iron, copper, zinc, lead, aluminum, and nickel, alloys mainly based on those metals (e.g., carbon steel or cast iron for iron, stainless steel), or alloys mainly based on two or more of those metals. Among them, the low melting point reactant is preferably an iron alloy in the form of powder or fiber. Further, the low melting point reactant preferably has a particle diameter or a fiber diameter (an average diameter) of from 10 to 200 μm. Examples of a shape of the low melting point reactant include a spherical shape, a wound-lozenge shape, a konpeito shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried.

Subsequently, materials forming two types of magnetic substances in which at least two of the maximum magnetic permeability, the Curie point, and the intrinsic resistance value are different are provided so as to coat the surfaces of the partition walls in different cells of the honeycomb dried body. Specifically, first, the magnetic powder and the glass powder are blended in a volume ratio of 9:1, to which a binder, a dispersant, and water are added to prepare a paste. The paste is then injected into the cells of the partition walls. After drying and degreasing the paste, it is baked in the cell walls in a vacuum atmosphere. For the binder, carboxymethyl cellulose or the like can be used.

Subsequently, a raw material for the plugged portions is prepared. The material for the plugged portions (plugging slurry) may use the same material for a green body as that of the partition walls (honeycomb dried body), or may use a different material. Specifically, the raw material for the plugged portions can be obtained by mixing a ceramic raw material, a surfactant, and water, and optionally adding a sintering aid, a pore former and the like to form a slurry, which is kneaded using a mixer or the like.

Subsequently, masks are applied onto some of cell opening portions on one end face of the honeycomb dried body, and the end face is immersed in a storage container in which the plugging slurry is stored to fill the non-masked cells with the plugging slurry. Similarly, masks are applied onto some of cell opening portions on the other end face of the honeycomb dried body, and the end face is immersed in a storage container in which the plugging slurry is stored to fill the non-masked cells with the plugging slurry. In this case, both ends of each cell coated with the above two types of magnetic materials are plugged. It is then dried and fired to obtain a honeycomb structure having plugged portions. As the drying conditions, the same conditions as those for drying the honeycomb formed body can be used. Further, the conditions for the above firing can be typically in an air atmosphere at a temperature of 1410 to 1440° C. for 3 to 15 hours, when the cordierite-forming raw material is used.

A method of plugging is simply carried out by pushing a paste-like material into the cells with a spatula such as a squeegee. It is easy to control the depth by the number of squeegee processes pushed. The number of pushing processes is increased for the portions of the cells desired to insert the magnetic material deeply, and the number of pushing processes is decreased for shallow portions around the former cells.

Further, when the resulting honeycomb structure is produced in a state where the outer peripheral wall is formed on the outer peripheral surface of the honeycomb structure, the outer peripheral surface may be ground to remove the outer peripheral wall. The coating material is applied to the outer circumference of the honeycomb structure from which the outer peripheral wall has thus been removed, in a subsequent step, to form an outer peripheral coating. Further, when grinding the outer peripheral surface, a part of the outer peripheral wall may be ground and removed, and on that part, the outer peripheral coating may be formed by the coating material.

When preparing the coating material, it can be prepared using, for example, a biaxial rotary type vertical mixer.

Further, the coating material may further contain colloidal silica, an organic binder, clay and the like. The content of the organic binder is preferably from 0.05 to 0.5% by mass, and more preferably from 0.1 to 0.2% by mass. The content of the clay is preferably from 0.2 to 2.0% by mass, and more preferably from 0.4 to 0.8% by mass.

The coating material is applied onto the outer peripheral surface of the honeycomb structure previously produced, and the applied coating material is dried to form an outer peripheral coating. Such a structure can allow for effective suppression of cracking in the outer peripheral coating during the drying and the heat treatment.

Examples of a method for coating the coating material can include a method for applying the coating material by placing the honeycomb structure on a rotating table and rotating it, and pressing a blade-shaped applying nozzle along the outer peripheral portion of the honeycomb structure while discharging the coating material from the applying nozzle. Such a configuration can allow the coating material to be applied with a uniform thickness. Further, this method can lead to a decreased surface roughness of the formed outer peripheral coating, and can result in an outer peripheral coating that has an improved appearance and is difficult to be broken by thermal shock.

When the outer peripheral surface of the honeycomb structure is ground and the outer peripheral wall is removed, the coating material is applied onto the entire outer peripheral surface of the honeycomb structure to form the outer peripheral coating. On the other hand, when the outer peripheral wall is present on the outer peripheral surface of the honeycomb structure or a part of the outer peripheral wall is removed, the coating material may be partially applied to form the outer peripheral coating, or the coating material may be, of course, applied onto the entire outer peripheral surface of the honeycomb structure to form the outer peripheral coating.

The method for drying the applied coating material (i.e., the undried outer peripheral coating) is not limited, but in terms of preventing dry-cracking, it can suitably use, for example, a method of drying 25% or more of a water content in the coating material by maintaining the coating material at room temperature for 24 hours or more, and then maintaining it in an electric furnace at 600° C. for 1 hour or more to remove moisture and organic matters.

Further, when the opening portions of the cells of the honeycomb structure are not plugged in advance, plugging may be performed in the opening portions of the cells after forming the outer peripheral coating.

Furthermore, the silicon carbide powder contained in the coating material develops color by irradiating the outer peripheral surface of the resulting honeycomb structure with laser. Therefore, product information or the like may be printed (marked) on the outer peripheral coating of the resulting honeycomb structure by irradiating it with laser light.

Preferred examples of laser light used for marking with laser include carbon dioxide gas ($CO_2$) laser, YAG laser and $YVO_4$ laser. Laser conditions for irradiation with the laser light can be appropriately selected according to the type of the laser to be used. For example, when the $CO_2$ laser is used, the marking is preferably carried out at an output of from 15 to 25 W and a scan speed of from 400 to 600 mm/s. Such a marking method allows the irradiated portion to develop color so as to present dark color such as black to green, resulting in very good contrast due to color development to the non-irradiated portion.

When supporting the catalyst on the honeycomb structure, the printed portion is not deteriorated even after printing with the laser, and the printed portion can be read well even after supporting the catalyst. The method for supporting the catalyst is not particularly limited and can be carried out according to the method for supporting the catalyst carried out in the conventional method for producing the honeycomb structure.

Embodiment 2

Figure 3A:
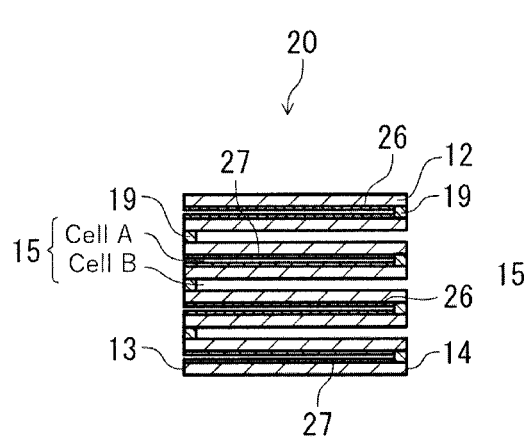
FIG. 3 (a) is a cross-sectional view schematically showing a cross section of cells having plugged portions and partition walls of a honeycomb structure according to Embodiment 2 of the present invention, the cross section being parallel to an extending direction of the cells.
FIG. 3(b) is a plane view schematically showing one end face of a honeycomb structure according to Embodiment 2 of the present invention.
Figure 3B:
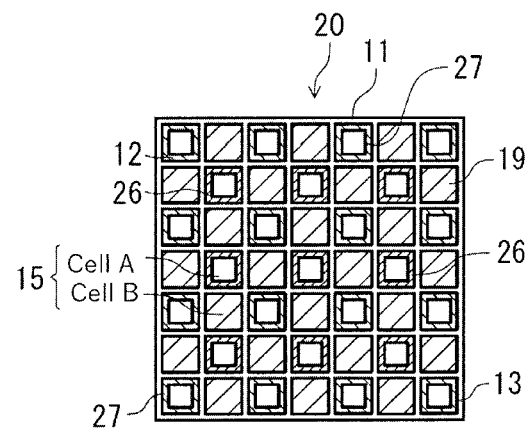

FIG. 3 (*a*) is a cross-sectional view schematically showing a cross section of cells 15 having plugged portions 19 and partition walls 12 of a honeycomb structure 20 according to Embodiment 2 of the present invention, the cross section being parallel to an extending direction of the cells 15. FIG. 3(*b*) is a plane view schematically showing one end face 13 of the honeycomb structure 20 according to Embodiment 2 of the present invention. As shown in FIG. 3(*b*), the honeycomb structure 20 according to Embodiment 2 of the present invention has a staggered arrangement where the cells A and B forming the cells 15 are alternately arranged in vertical and horizontal directions.

The cells 15 of the honeycomb structure 20 are provided with permeable films 26, 27 on the surfaces of the partition walls 12 in at least a part of the cells A and B. The permeable films 26, 27 are provided in the cells 15 that are different from each other. The permeable films 26, 27 contain magnetic substances different from each other. The magnetic substance contained in the permeable film 26 and the magnetic substance contained in the permeable film 27 are different in at least two of a maximum magnetic permeability, a Curie point, and an intrinsic resistance value. The magnetic substances contained in the permeable films 26, 27 may employ the magnetic substances 16, 17 discussed in Embodiment 1. According to such a configuration, the honeycomb structure 20 contains two or more types of magnetic substances in which at least two of the maximum magnetic permeability, the Curie point, and the intrinsic resistance value are different in the cells 15, so that, as in Embodiment 1, both of a time required for heating to a temperature at which water evaporates and a time required for catalytic activity in the case of a filter having a supported catalyst are shorter, and carbon fine particles and the like can be burned out and removed by induction heating.

The permeable films 26, 27 of the honeycomb structure 20 are not particularly limited as long as they are of two or more types, and three types, four types, or five or more types of the permeable films may be contained in different cells 15. For example, a total of three types of permeable films respectively containing only one of three types of magnetic substances which are different in at least two of the maximum magnetic permeability, the Curie point, and specific resistance value may be provided in different cells 15.

The permeable films 26, 27 have the same permeability as that of the surface layer discussed in Embodiment 1. Further, the permeable films 26, 27 can be formed by containing the magnetic substances 16, 17 in the materials forming the surface layers discussed in Embodiment 1. A percentage of the magnetic substances 16, 17 contained in the permeable films 26, 27 is not particularly limited, but from 50 to 90% by volume of the magnetic substances 16, 17 can be contained in the permeable films 26, 27, respectively.

When magnetic particles are used as the magnetic substances contained in the permeable films 26, 27, the magnetic particles preferably have a weight average particle diameter of 20 μm or less. The weight average particle diameter of 20 μm or less can allow the target average pore diameter, thickness, and porosity of the permeable films 26, 27 to be within satisfactory ranges, in combination with other controllable design factors. Although any lower limit of the weight average particle diameter of the magnetic particles is not particularly set, it can be, for example, 0.5 μm or more. It is to understand that the weight average particle diameter is measured by a laser diffraction type particle size distribution measuring device.

Further, the magnetic particles preferably have a shortest diameter d of from 0.1 to 5 μm, and more preferably L/d≥3 in which L (μm) is the longest diameter of the magnetic particles. This can allow a microstructure of each of the permeable films 26, 27 ensuring sufficient permeability while maintaining electrical conductivity to be ensured. The shortest diameter d is obtained by performing image analysis of the SEM captured images for 50 particles and determining maximum line segments among line segments orthogonal to the longest diameters to be the shortest diameters of the particles, which are averaged by the number of particles.

The longest diameter L is obtained by averaging the longest diameters of 50 or more particles by the number of particles in the SEM image. Preferably, the magnetic particles are needle-shaped. The needle-shaped refers to a ratio L/d≥5.

The method for producing the honeycomb structure 20 can be carried out in the same manner as that of the method for producing the honeycomb structure 10, with the exception that the permeable films 26, 27 containing the magnetic substances are provided in place of the magnetic substances 16, 17. For the formation of the permeable films 26, 27 of the honeycomb structure 20, for example, first, the magnetic substance 16 is mixed with a base material to obtain a material of the permeable film 26, and the magnetic substance 17 is mixed with the base material to obtain a material of the permeable film 27. Non-limiting examples of the base material may include materials containing a metal or glass as a main component, materials containing silica or alumina as a main component, and materials further containing an organic substance or an inorganic substance in those materials. The materials of the permeable films 26, 27 are provided so as to coat the surfaces of the partition walls in different cells of the honeycomb dried body. The permeable films can be applied by sucking mixed powder from one side in a dry manner. Alternatively, the mixed powder can be slurried or pasted, and then applied in a wet manner. Steps after the plugged portions are provided can be the same as those in Embodiment 1.

Embodiment 3

Figure 4A:
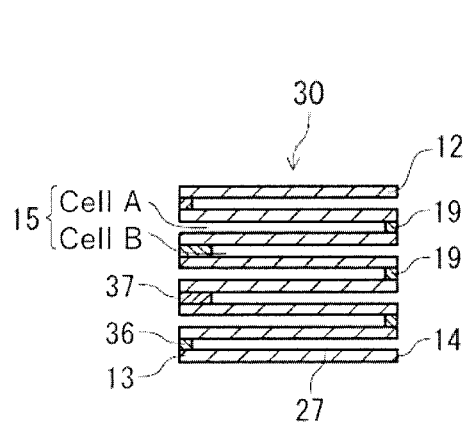
FIG. 4 (a) is a cross-sectional view schematically showing a cross section of cells having plugged portions and partition walls of a honeycomb structure according to Embodiment 3 of the present invention, the cross section being parallel to an extending direction of the cells.
FIG. 4(b) is a plane view schematically showing one end face of a honeycomb structure according to Embodiment 3 of the present invention.
FIG. 4(c) is a plane view schematically showing another form of one end face of a honeycomb structure according to Embodiment 3 of the present invention.
Figure 4B:
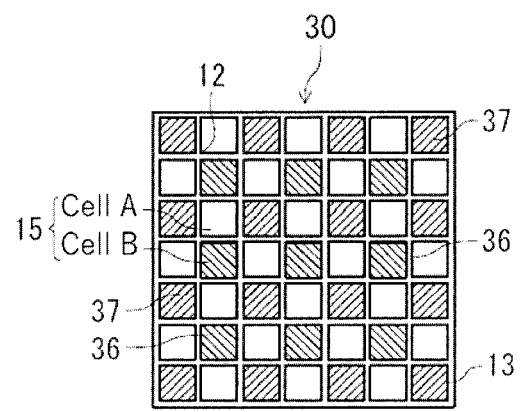
Figure 4C:
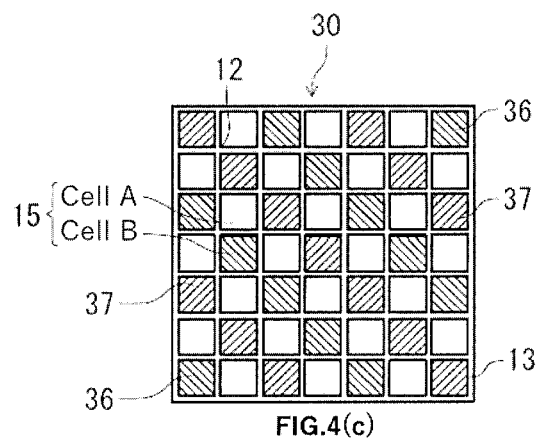

FIG. 4 (*a*) is a cross-sectional view schematically showing a cross section of cells 15 having plugged portions 19 and partition walls 12 of a honeycomb structure 30 according to Embodiment 3 of the present invention, the cross section being parallel to an extending direction of the cells 15. FIG. 4(*b*) is a plane view schematically showing one end face 13 of the honeycomb structure 30 according to Embodiment 3 of the present invention. FIG. 4(*c*) is a plane view schematically showing another form of one end face 13 of the honeycomb structure 30 according to Embodiment 3 of the present invention. As shown in FIGS. 4(*b*) and 4(*c*), the honeycomb structure 30 according to Embodiment 3 of the present invention has a staggered arrangement where the cells A and B forming the cells 15 are alternately arranged in vertical and horizontal directions.

In the honeycomb structure 30, one end face 13 serves as an end face on a fluid inflow side, and the other end face 14 serves as an end face on a fluid outflow side. The end face 13 on the fluid inflow side has plugged portions 36, 37 in different cells B, respectively. FIG. 4(*b*) shows an example in which the same types of plugged portions of the plugged portions 36, 37 are vertically and horizontally arranged, respectively. FIG. 4(*c*) shows an example in which different types of plugged portions of the plugged portions 36, 37 are alternately arranged in vertical and horizontal directions. The end face 14 on the fluid outflow side has the same plugged portions 19 as those used in Embodiment 1.

The plugged portions 36, 37 contain magnetic substances different from each other. The magnetic substance contained in the plugged portion 36 and the magnetic substance contained in the plugged portion 37 are different in at least two of a maximum magnetic permeability, a Curie point, and an intrinsic resistance value. The magnetic substances contained in the plugged portions 36, 37 may employ the magnetic substances 16, 17 discussed in Embodiment 1. According to such a configuration, the honeycomb structure 30 contains two or more types of magnetic substances in which at least two of the maximum magnetic permeability, the Curie point, and the intrinsic resistance value are different in the cells 15, so that, as in Embodiment 1, both of a time required for heating to a temperature at which water evaporates and a time required for catalytic activity in the case of a filter having a supported catalyst are shorter, and carbon fine particles and the like can be burned out and removed by induction heating.

The plugged portions 36, 37 of the honeycomb structure 30 are not particularly limited as long as they are of two or more types, and three types, four types, or five or more types of the plugged portions may be contained in different cells 15. For example, a total of three types of plugged portions respectively containing only one of three types of magnetic substances which are different in at least two of the maximum magnetic permeability, the Curie point, and specific resistance value may be provided in different cells 15.

The plugged portions 36, 37 may be made of a material used as plugged portions of the conventionally known honeycomb structure as a base material, and the base material may contain magnetic substances 16, 17, or may consist only of the magnetic substances 16, 17.

As shown in FIG. 4(*a*), the honeycomb structure 30 is provided with the plugged portions 36, 37 containing the magnetic substances in different cells B, on the end face 13 on the fluid inflow side. Therefore, in an exhaust gas purifying device using the honeycomb structure 30, coil wirings that spirally surround the outer circumference of the honeycomb structure 30 are arranged at positions corresponding to the plugged portions 36, 37 of the cells B. That is, only arranging of the coil wirings near the end face of the fluid inflow side of the honeycomb structure 30 so as to spirally surround the outer circumference of the honeycomb structure 30 to cause induction heating can allow heat from the end face heated on the inflow side to be propagated in the partition walls 12 and the cells 15 as the fluid moves, and can cause the honeycomb structure 30 to be heated to the outflow side. Therefore, this eliminates necessity to heat the entire honeycomb structure 30 in the length direction, so that the energy efficiency can be improved. Further, since only local heating is required without heating the entire honeycomb structure 30 in the length direction, an input power until combustion of PMs (particulate matters) can be reduced. Further, the PMs (particulate matters), which tend to be unevenly distributed near the end face in the cell 15, can be rapidly burned out and removed to easily regenerate the honeycomb structure filter.

Further, the honeycomb structure 30 is not limited to such a configuration, and each of the end faces 13, 14 may be an end face on the inflow side or outflow side of the fluid. Further, one or both of the plugged portion of the cell A and the plugged portion of the cell B forming the cells 15 of the honeycomb structure 30 may contain the two or more types of magnetic substances. The honeycomb structure 30 is configured such that one or both of the plugged portion of the cell A and the plugged portion of the cell B forming the cells 15 of the honeycomb structure 30 may contain the two or more types of magnetic substances, whereby the plugged portions will continuingly contain the magnetic substances when the honeycomb structure 30 is used as a honeycomb filter. Therefore, this eliminates necessity to use the cells 15 of the honeycomb structure 30 only for filling the material containing the magnetic substance. As a result, an increase in pressure loss can be suppressed.

Further, in the illustrated honeycomb structure 30, depths of the plugged portions 36, 37 of the cells B containing the magnetic substances in the cell extending direction gradually decreases from the center toward the outer circumference of the honeycomb structure 30. According to such a configuration, when the coil wirings are arranged at the positions corresponding to the plugged portions 36, 37 of the cells B, that is, when the coil wirings are arranged so as to spirally surround the outer circumference of the honeycomb structure 30 near the end face 13 on the fluid inflow side of the honeycomb structure 30 to cause induction heating, the depths of the plugged portions 36, 37 on the outer circumferential side of the honeycomb structure 30 are the shortest. Further, the plugged portions 36, 37 gradually become deeper toward the center. Therefore, the heat generated by the induction heating is not easily blocked by the plugged portions 36, 37 on the outer side, and the honeycomb structure 30 is satisfactorily heated to the center. The form of gradually decreasing from the center toward the outer circumference of the honeycomb structure 30 is not particularly limited, and it can be appropriately designed. For example, the depths preferably decrease at an equal proportion from the center to the outer circumference of the honeycomb structure 30. In the illustrated honeycomb structure 30, the depths of the plugged portions 36, 37 of the cells B containing the magnetic substances in the cell extending direction gradually decrease from the center toward the outer circumference of the honeycomb structure 30 as described above, although not limited thereto. The depths of one or both of the plugged portions 19 of the cells A and the plugged portions 36, 37 of the cells B, which contain the magnetic substances, in the cell extending direction may gradually decrease from the center toward the outer circumference of the honeycomb structure 30. Further, the honeycomb structure 30 may be formed such that the depths of one or both of the plugged portions 19 of the cells A and the plugged portions 36, 37 of the cells B, which contain the magnetic substances, in the cell extending direction are changed from the center toward the outer circumference of the honeycomb structure 30 in order to match to a desired purpose as needed.

The method for producing the honeycomb structure 30 can be carried out in the same manner as that of the method for producing the honeycomb structure 10, with the exception that the plugged portions 36, 37 containing the magnetic substances are provided in the cells B in place of providing the magnetic substances 16, 17 on the surfaces in the cells 15. For the formation of the plugged portions 36, 37 of the honeycomb structure 30, for example, first, the magnetic substance 16 is mixed with a base material to obtain a material of the plugged portion 36, and the magnetic substance 17 is mixed with the base material to obtain a material of the plugged portion 37. The materials of the plugged portions 36, 37 are used to form the plugged portions of the different cells B of the honeycomb dried body. Steps after the plugged portions are provided can be the same as those in Embodiment 1.

Embodiment 4

Figure 5:
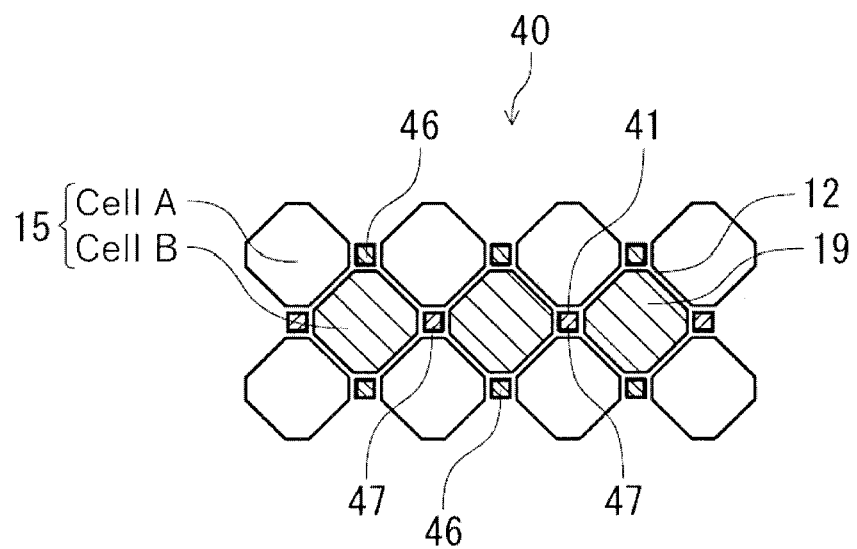
FIG. 5 is a plane view schematically showing a part of one end face of a honeycomb structure according to Embodiment 4 of the present invention.

FIG. 5 is a plane view schematically showing a part of one end face of a honeycomb structure 40 according to Embodiment 4 of the present invention. In the honeycomb structure 40, a cell (second cell) 41 having a cross-sectional area lower than that of each of the cells A and B (first cell) is arranged between the cells A and B forming the cells 15.

The interior of each of the second cells 41 is filled with a material containing any one of two types of magnetic substances 46, 47. Here, the "filled" may be a state where the material containing the magnetic substance 46, 47 is tightly packed inside the second cells 41, or may be a state where the interior of each second cell 41 has gaps (spaces having no material containing the magnetic substance 46, 47). The two types of the magnetic substances 46, 47 are different in at least two of a maximum magnetic permeability, a Curie point, and an intrinsic resistance value. According to such a configuration, the honeycomb structure 40 can allow both of a time required for heating to a temperature at which water evaporates and a time required for catalytic activity in the case of a filter having a supported catalyst to be made shorter, and carbon fine particles and the like to be burned out and removed by induction heating.

The magnetic substances 46, 47 of the honeycomb structure 40 are not particularly limited as long as they are of two or more types, and three types, four types, or five or more types of the magnetic substances may be contained in different second cells 41, respectively. For example, a total of three types of magnetic substances which are different from one another in at least two of the maximum magnetic permeability, the Curie point, and specific resistance value may be provided in different second cells 41.

Each second cell 41 may not be provided between the cell A and the cell B, and it may be arranged adjacent to at least one of the cell A and the cell B. According to such a configuration, the material containing the magnetic substance 46, 47 is filled in the second cell 41 arranged adjacent to at least one of the cell A and the cell B, so that the honeycomb structure 40 is heated by electromagnetic induction. Therefore, it is not necessary to pass electricity through the honeycomb structure 40 itself, so that any occurrence of a short circuit can be suppressed even in an environment where condensed water is generated. Further, since the second cells 41 having a lower cross-sectional area than that of the cells 15 are filled with the materials containing the magnetic substances 46, 47, there is no need to sacrifice the flow path by filling the cells 15 serving as the flow paths for the fluid with the materials containing the magnetic substances 46, 47. This can allow both an increase in pressure loss of the honeycomb structure 40 and the good heating efficiency to be achieved at the same time. Further, when purifying the harmful gas components in the exhaust gas with a catalyst, the honeycomb structure having such configurations can allow a temperature of the catalyst to be rapidly increased to a catalyst activation temperature or more by induction heating at the time when a gasoline engine or a diesel engine is started.

A cross-sectional shape of each cell 15 is formed into an octagon having eight corner portions in total, such that each corner portion of a quadrangle is removed to form two new corner portions. Each of the plurality of cells 15 has such an octagonal shape, and the cells 15 are regularly arranged in the same direction as the outermost circumference of the honeycomb structure 40.

Each of the cells 15 has a polygonal opening, and the plurality of second cells 41 may be arranged adjacent to at least one corner portion of the polygonal opening of each of the cells 15. According to such a configuration, the plurality of cells 15 can be easily arranged so as to have a close-packed structure in the cross section of the honeycomb structure 40, and the second cells 42 filled with the materials containing the magnetic substances 46, 47 can be arranged adjacent to the cells 15 without sacrificing the cells 15 forming the flow paths for the fluid or with minimized reduction in the cross-sectional area of the cells 15. Therefore, it is possible to suppress an increase in the pressure loss of the honeycomb structure 40 and further improve the heating efficiency of the honeycomb structure 40. Further, since the corner portions of the cells 15 are also portions where a catalyst wash coat for thinly impregnating a catalyst component to be provided inside the cells 15 tends to be unevenly distributed when the catalyst is supported, the provision of the second cells 41 filled with the materials containing the magnetic substances 46, 47 near the corner portions results in an enhanced effect of improving a purification rate by heating the catalyst.

The arrangement of the cells 15, the second cells 41 and the partition walls 12 is not limited to that illustrated in FIG. 5, as long as each of the second cells 41 is arranged adjacent to at least one of the cells A and B. The shapes of the cells 15 and the second cells 41 may be preferably polygonal such as a triangle, a quadrangle, a pentagon, a hexagon, and an octagon; circular, or elliptical in a cross section orthogonal to the central axis, or other non-defined shapes, although not particularly limited thereto. The number, arrangement, shape, and the like of the cells 15 and the second cells 41, the thickness of the partition walls, and the like are not limited, and they can be appropriately designed as needed.

The cross-sectional area of the second cells 41 is not particularly limited as long as it is lower than that of the cells 15. Preferably, a ratio of the cross-sectional area of the second cells 41 to the total cross-sectional area of the cells 15 and the second cells 4 is 10% or less. According to such a configuration, it is possible to further suppress an increase in pressure loss while maintaining good heating efficiency of the honeycomb structure 40. The ratio of the cross-sectional area of the second cells 41 to the total cross-sectional area of the cells 15 and the second cells 41 is more preferably 8% or less, and even more preferably 5% or less. The lower limit of the ratio of the cross-sectional area of the second cells 41 to the total cross-sectional area of the cells 15 and the second cells 41 may be typically 1% or more, or 2% or more, although it depends on a degree of heating efficiency of the honeycomb structure 40.

It is preferable that equivalent hydraulic diameters of the cells 15 are at least twice those of the second cells 41. According to such a configuration, it is possible to further suppress an increase in pressure loss while maintaining good heating efficiency of the honeycomb structure 40. The equivalent hydraulic diameters of the cells 15 are preferably 5 times or more, and even more preferably 8 times or more, those of the second cells 41.

The materials containing the magnetic substances 46, 47 to be filled in the second cells 41 is composed of the magnetic substances 46, 47 and matrices containing the magnetic substances 46, 47. The matrix may be, for example, a material containing a metal or glass as a main component, or a material containing silica or alumina as a main component, or a material further containing an organic substance or an inorganic substance in those materials, although not particularly limited thereto. Further, only the magnetic substances 46, 47 may be filled in the second cells 41.

A shape of the magnetic substance 46, 47 may be linear or particulate, although not particularly limited thereto. When the linear magnetic substance 46, 47 is used, the material containing one linear magnetic substance 46, 47 such as a metal wire may be filled in the second cells 41, or the material containing a plurality of linear magnetic substances 46, 47 may be filled in the second cells 41. When the particulate magnetic substances 46, 47 are used, a particle size of each magnetic substance 46, 47 is appropriately set within a range equal to or less than the diameter of each second cell 41. More particularly, the magnetic substances 46, 47 preferably have a weight average particle size of 20 μm or less. The lower limit of the weight average particle size of the magnetic substances 46, 47 is not particularly set, but it may be, for example, 0.5 μm or more. It should be noted that the weight average particle size is measured by a laser diffraction type particle size distribution measuring device. Further, powder composed of the particulate magnetic substance 46, 47 alone may be filled in the second cells 41, or composite powder of the magnetic substance and other materials such as glass may be filled in the second cells 41. The powder filled in the second cells 41 may be in a state where the powder is coated onto the partition walls in the second cells 41. When the powder is thus used as the material containing the magnetic substance 46, 47, the induction heating frequency is set to be higher (for example, set to 100 kHz or higher) than when the material containing the linear magnetic substance 46, 47 is used, so that temperature rising rate performance equivalent to that of the material containing the linear magnetic substance 46, 47 can be obtained.

The method for producing the honeycomb structure 40 can be carried out in the same manner as that of the method for producing the honeycomb structure 10 discussed in Embodiment 1, with the exception that the honeycomb dried body is formed such that each of the second cells 41 is arranged adjacent to at least one of the cells A and B, and the magnetic substances are filled in different second cells 41.

There are mainly three methods for filling the second cells with the magnetic substances, as follows:
- a method of pouring a slurry containing a magnetic substance and a binding material based on a metal or glass into the second cells of the honeycomb structure, and heating it at a temperature equal to or higher than a melting point of the metal or a softening point of the glass to solidify it;
- a method of pouring a slurry containing a magnetic substance and an adhesive material based on silica or alumina into the second cells of the honeycomb structure, and heating it to solidify silica or alumina; and
- a method of inserting a material containing a linear magnetic substance such as wire-shaped substance into the second cells of the honeycomb structure.

In order to pour the slurry into the second cells of the honeycomb structure, for example, the slurry may be circulated in the second cells of the honeycomb structure, or the second cells of the honeycomb structure are immersed in the slurry. Here, when the binding material based on the metal or glass is used, it is necessary to melt or soften the honeycomb substrate once at a temperature equal to or lower than a heat resistant temperature of the honeycomb substrate during the production. Therefore, the heating at a temperature equal to or lower than a melting point or a softening point of the binding material is preferable. Further, in the usage environment, the maximum temperature reaches about 700° C. Therefore, it is more preferable to use a metal or glass having a melting point or a softening point equal to or higher than that temperature. The specific melting point or softening point is, for example, from 800 to 1200° C. On the other hand, when the adhesive material based on silica or alumina is used, it is preferable that the adhesive material can be solidified by heating and drying during production. Examples of the adhesive material that can be solidified by heating and drying include a colloidal dispersion of silica or alumina, and may be a colloidal dispersion containing silica and alumina.

Further, since the maximum temperature in the usage environment reaches about 700° C., it is more preferable to use silica or alumina having a heat resistant temperature equal to or higher than that temperature. After pouring the slurry into the second cells of the honeycomb structure, a suction jig is attached to a downstream side of the honeycomb structure, and suction is performed from the other opening end side downstream of the honeycomb structure to remove excess water to fill the second cells with the material containing the magnetic substance. The material containing the magnetic substance is preferably heated under conditions of a temperature of 800 to 1200° C. for 0.5 to 3 hours.

When the adhesive material based on alumina or silica is used, the step of pouring the slurry into the cells may be performed at the stages of honeycomb formed body and the honeycomb dried body. In this case, after pouring the slurry into the second cells of the honeycomb structure, it is dried, and then, in the firing step of the honeycomb structure, the magnetic substance is fixed to the adhesive at the same time. The silica or alumina preferably exhibits the solidifying effect by drying.

In addition to addition of the binding material based on the metal or glass, the magnetic substance may be previously coated with the binding material based on the metal or glass. Further, a step of forming composite particles containing magnetic particles and a binding material may be provided.

The slurry can be obtained, for example, by mixing the magnetic substance, the adhesive material or the binding material, the organic binder, and water or alcohol. Further, an oil and fat, and a surfactant may be further added to the slurry, mixed and emulsified.

Embodiment 5

Figure 6A:
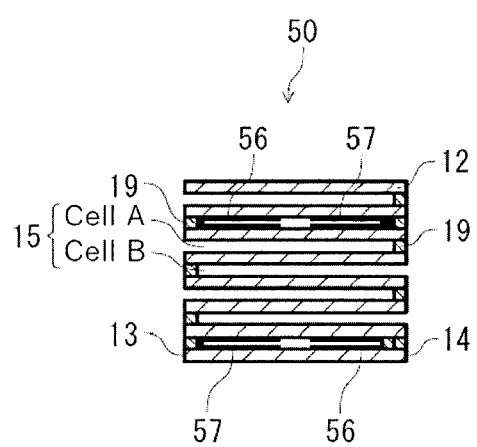
FIG. 6 (a) is a cross-sectional view schematically showing a cross section of cells having plugged portions and partition walls of a honeycomb structure according to Embodiment 5 of the present invention, the cross section being parallel to an extending direction of the cells.
FIG. 6(b) is a cross-sectional view schematically showing a cross section of cells having plugged portions and partition walls of a honeycomb structure according to Embodiment 5 of the present invention, the cross section being perpendicular to an extending direction of the cells.
Figure 6B:
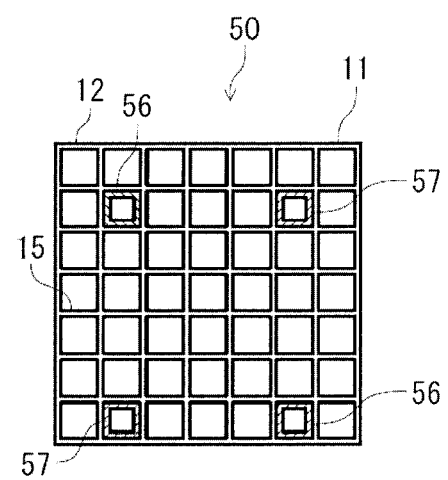

FIG. 6 (*a*) is a cross-sectional view schematically showing a cross section of cells 15 having plugged portions 19 and partition walls 12 of a honeycomb structure 50 according to Embodiment 5 of the present invention, the cross section being parallel to an extending direction of the cells 15. FIG. 6(*b*) is a cross-sectional view schematically showing a cross section of the cells 15 having the plugged portions 19 and the partition walls 12 of the honeycomb structure 50 according to Embodiment 5 of the present invention, the cross section being perpendicular to an extending direction of the cells 15.

The honeycomb structure 50 contains two types of magnetic substances 56, 57 in the same cell 15, respectively. The magnetic substances 56, 57 of the honeycomb structure 50 are not particularly limited as long as they are of two or more types, and three types, four types, or five or more types of the magnetic substances may be contained in the same cell 15, respectively.

Each of the magnetic substances 56, 57 is provided so as to coat surfaces of the partition walls 12 in the cell 15. Each of the magnetic substances 56, 57 may be filled so as to fill the entire space in the cell 15. The cells 15 provided with the magnetic substances 56, 57 are provided with plugged portions 19 on both of one end face 13 and the other end face 14 of the honeycomb structure 50. The magnetic substances 56, 57 are preferably provided at different positions on the surfaces of the partition walls 12 of the cell 15 in order to prevent them from reacting with each other. Further, the magnetic substances 56, 57 are preferably provided so as to be separated from each other.

The magnetic substances 56, 57 are different from each other in at least two of a maximum magnetic permeability, a Curie point, and an intrinsic resistance value. According to such a configuration, the honeycomb structure 50 contains two or more types of magnetic substances in which at least two of the maximum magnetic permeability, the Curie point, and the intrinsic resistance value are different in the cell 15, so that, as in Embodiment 1, both of a time required for heating to a temperature at which water evaporates and a time required for catalytic activity in the case of a filter having a supported catalyst are shorter, and carbon fine particles and the like can be burned out and removed by induction heating.

The magnetic substances 56, 57 of the honeycomb structure 50 are not particularly limited as long as they are of two or more types, and three types, four types, or five or more types of the magnetic substances may be contained in the same cell 15. For example, a total of three types of magnetic substances which are different in at least two of the maximum magnetic permeability, the Curie point, and specific resistance value may be provided in the same cell 15.

The positions of the cells 15 provided with the magnetic substances 56, 57 of the honeycomb structure 50 are not particularly limited, but the magnetic substance 56 and the magnetic substance 57 have different functions as described above. Therefore, it is preferable that they are spaced apart from each other rather than adjacent to each other. For example, as shown in FIGS. 6(*a*) and 6(*b*), it is preferable that the cell 15 provided with the magnetic substance 56 on one end face 13 side and the magnetic substance 57 on the other end face 14 side, and the cell 15 provided with the magnetic substance 57 on one end face 13 side and the magnetic substance 56 provided on the other end surface 14 side are alternately arranged. The positions or number of the cells 15 provided with the magnetic substances 56, 57 can be appropriately designed in view of the heating efficiency and pressure loss of the honeycomb structure 50.

Each of the magnetic substances 56, 57 is wire-shaped, and may be provided apart from each other in the same cell 15. Further, the magnetic substances 56, 57 are wire-shaped, and the surface of at least one wire-shaped magnetic substance may be coated with a reaction prevention layer. In such a case, the magnetic substances 56, 57 are prevented from reacting with each other by the reaction prevention layer. Therefore, it is not necessary to provide the wire-shaped magnetic substances 56, 57 separately in the same cell 15, and they can be provided in the cell 15 in order in the normal direction in the extending direction of the cells 15. Further, the wire-shaped magnetic substances 56, 57 can be provided continuously, i.e., in contact with each other, in the same cell 15 in the extending direction of the cells 15. The reaction prevention layer is formed of a material capable of suppressing the reaction when the magnetic substance 56 is brought into contact with the magnetic substance 57 or when they are brought into contact with each other and heated. Examples of the material of the reaction prevention layer include $SiO_2$—$Al_2O_3$—MgO-based glass.

The method for producing the honeycomb structure 50 can be carried out in the same manner as that of the method for producing the honeycomb structure 10 shown in Embodiment 1, with the exception that the magnetic substances are provided in the same cell.

Embodiment 6

FIG. 7 (*a*) is a cross-sectional view schematically showing a cross section of cells 15 having plugged portions 19 and partition walls 12 of a honeycomb structure 60 according to Embodiment 6 of the present invention, the cross section being parallel to an extending direction of the cells 15. FIG. 7(*b*) is a cross-sectional view schematically showing another form of the cells 15 having the plugged portions 19 and the partition walls 12 of the honeycomb structure 60 according to Embodiment 6 of the present invention, the cross section being parallel to an extending direction of the cells 15.

The honeycomb structure 60 contains two types of magnetic substances 66, 67 in the same cell 15, respectively. The magnetic substances 66, 67 of the honeycomb structure 60 are not particularly limited as long as they are of two or more types, and three types, four types, or five or more types of the magnetic substances may be contained in the same cell 15, respectively. For example, three types of magnetic substances different from each other in at least two of the maximum magnetic permeability, the Curie point, and the intrinsic resistance value may be provided in the same cell 15.

Figures 7A, 7B:
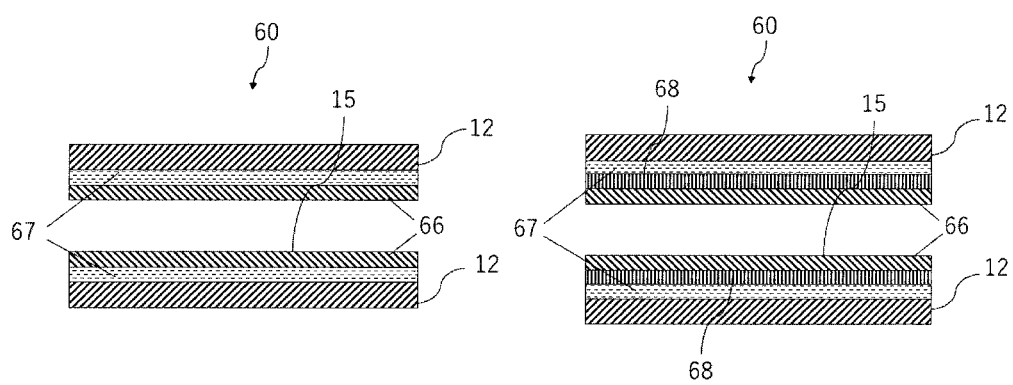
FIG. 7(b) is a cross-sectional view schematically showing another form of cells having plugged portions and partition walls of a honeycomb structure according to Embodiment 6 of the present invention, the cross section being parallel to an extending direction of the cells.

In the embodiment as shown in FIG. 7(a), the magnetic substance 67 is provided so as to coat the surface of the partition wall 12 in the cell 15. The magnetic substance 66 is provided so as to coat the magnetic substance 67. The cells 15 provided with the magnetic substances 66, 67 are provided with plugged portion 19 on both of the one end face 13 and the other end face 14 of the honeycomb structure 60. In the embodiment as shown in FIG. 7(b), a reaction prevention layer 68 is provided between the coatings of the magnetic substances 66, 67 in order to prevent the magnetic substances 66, 67 from reacting with each other. The reaction prevention layer 68 to be used may be the same as the reaction prevention layer as discussed Embodiment 5.

The honeycomb structure 60 according to Embodiment 6 is not limited to the configurations as shown in FIGS. 7(a) and 7(b). Two or more types of magnetic substances may be, independently for each type, coated on the surface of the partition wall of the cell, and the independent magnetic substance coatings may be formed so as to be laminated in order in the normal direction in the cell extending direction. Further, the reaction prevention layer may be provided between the independent magnetic substance coatings.

The magnetic substances 66, 67 are different from each other in at least two of a maximum magnetic permeability, a Curie point, and an intrinsic resistance value. The magnetic substances 66, 67 to be used may be the magnetic substances 16, 17 as discussed in Embodiment 1. According to such a configuration, the honeycomb structure 60 contains two or more types of magnetic substances in which at least two of the maximum magnetic permeability, the Curie point, and the intrinsic resistance value are different in the cell 15, so that, as in Embodiment 1, both of a time required for heating to a temperature at which water evaporates and a time required for catalytic activity in the case of a filter having a supported catalyst are shorter, and carbon fine particles and the like can be burned out and removed by induction heating.

The method for producing the honeycomb structure 60 can be carried out in the same manner as that of the method for producing the honeycomb structure 10 shown in Embodiment 1, with the exception that the magnetic substances are provided in the same cell, and further different magnetic substances are coated onto the surfaces of the partition walls in order.

Embodiment 7

Figure 8A:
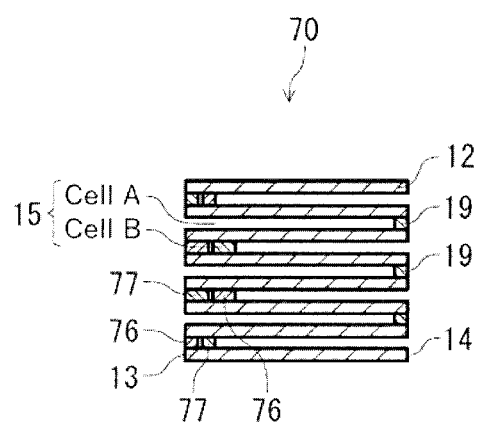
FIG. 8 (a) is a cross-sectional view schematically showing a cross section of cells having plugged portions and partition walls of the honeycomb structure according to Embodiment 7 of the present invention, the cross section being parallel to the extending direction of the cells.
FIG. 8(b) is a plane view schematically showing one end face of a honeycomb structure according to Embodiment 7 of the present invention.
FIG. 8(c) is a plane view schematically showing another form of one end face of a honeycomb structure according to Embodiment 7 of the present invention.
Figure 8B:
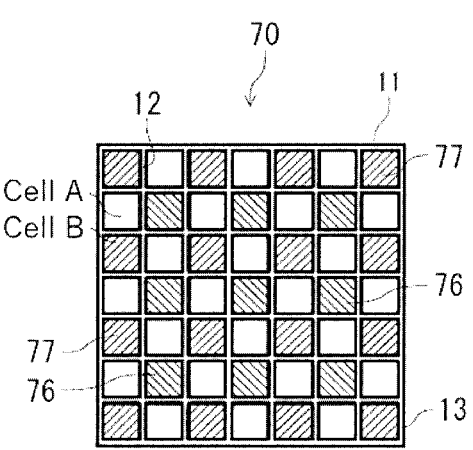
Figure 8C:
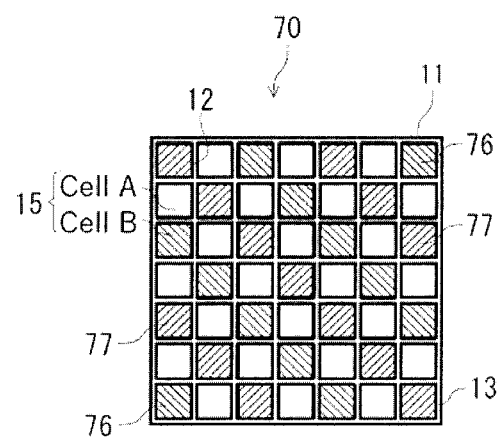

FIG. 8 (a) is a cross-sectional view schematically showing a cross section of cells 15 having plugged portions 19 and partition walls 12 of the honeycomb structure 70 according to Embodiment 7 of the present invention, the cross section being parallel to the extending direction of the cells 15. FIG. 8(b) is a plane view schematically showing one end face 13 of the honeycomb structure 70 according to Embodiment 7 of the present invention. FIG. 8(c) is a plane view schematically showing another form of one end face 13 of the honeycomb structure 70 according to Embodiment 7 of the present invention. As shown in FIGS. 8(b) and 8(c), the honeycomb structure 70 according to Embodiment 7 of the present invention has a staggered arrangement where cells A and B forming the cells 15 are alternately arranged in vertical and horizontal directions.

In the honeycomb structure 70, one end face 13 serves as an end face on a fluid inflow side, and the other end face 14 serves as an end face on a fluid outflow side. The end face 13 on the fluid inflow side has plugged portions 76, 77 in the same cell B, respectively. FIG. 8(b) shows an example in which the same types of plugged portions of the plugged portions 76, 77 are vertically and horizontally arranged, respectively. FIG. 8(c) shows an example in which different types of plugged portions of the plugged portions 76, 77 are alternately arranged in vertical and horizontal directions. The end face 14 on the fluid outflow side has the same plugged portions 19 as those used in Embodiment 1.

The plugged portions 76, 77 contain magnetic substances different from each other. The magnetic substance contained in the plugged portion 76 and the magnetic substance contained in the plugged portion 77 are different in at least two of a maximum magnetic permeability, a Curie point, and an intrinsic resistance value. The magnetic substances contained in the plugged portions 76, 77 may employ the magnetic substances 16, 17 discussed in Embodiment 1. According to such a configuration, the honeycomb structure 70 contains two or more types of magnetic substances in which at least two of the maximum magnetic permeability, the Curie point, and the intrinsic resistance value are different in the cell 15, so that, as in Embodiment 1, both of a time required for heating to a temperature at which water evaporates and a time required for catalytic activity in the case of a filter having a supported catalyst are shorter, and carbon fine particles and the like can be burned out and removed by induction heating.

The plugged portions 76, 77 of the honeycomb structure 70 are not particularly limited as long as they are of two or more types, and three types, four types, or five or more types of the plugged portions may be contained in the same cell 15, respectively. For example, a total of three types of plugged portions respectively containing only one of three types of magnetic substances which are different in at least two of the maximum magnetic permeability, the Curie point, and specific resistance value may be provided in the same cell 15.

It is preferable that the plugged portion 76 and the plugged portion 77 are spaced in the same cell 15 in order in the cell extending direction in order to prevent the plugged portions from reacting with each other.

The plugged portions 76, 77 may be made of a material used as plugged portions of the conventionally known honeycomb structure as a base material, and the base material may contain magnetic substances 16, 17, or may consist only of the magnetic substances 16, 17.

As shown in FIG. 8(a), the honeycomb structure 70 is provided with the plugged portions 76, 77 containing the magnetic substances in the same cell B, on the end face 13 on the fluid inflow side. Therefore, only arranging of coil wirings near the end face of the fluid inflow side of the honeycomb structure 70 so as to spirally surround the outer circumference of the honeycomb structure 70 to cause induction heating can allow heat from the end face heated on the inflow side to be propagated in the partition walls 12 and the cells 15 as the fluid moves, and can cause the honeycomb structure 70 to be heated to the outflow side. Therefore, an energy efficiency can be improved, and an input power until combustion of PMs (particulate matters) can be reduced. Further, the PMs (particulate matters), which tend to be unevenly distributed near the end face in the cell 15, can be rapidly burned out and removed to easily regenerate the honeycomb structure filter.

Further, the honeycomb structure 70 is not limited to such a configuration, and each of the end faces 13, 14 may be an end face on the inflow side or outflow side of the fluid. Further, one or both of the plugged portion of the cell A and the plugged portion of the cell B forming the cells 15 of the honeycomb structure 70 may contain the two or more types of magnetic substances. In the plugged portions containing the two or more types of magnetic substances, the two or more types of magnetic substances may be provided independently for each type in order in the cell extending direction. The honeycomb structure 70 is configured such that one or both of the plugged portion of the cell A and the plugged portion of the cell B forming the cells 15 of the honeycomb structure 70 may contain the two or more types of magnetic substances, whereby the plugged portions will continuingly contain the magnetic substances when the honeycomb structure 70 is used as a honeycomb filter. Therefore, this eliminates necessity to use the cells 15 of the honeycomb structure 70 only for filling the material containing the magnetic substance. As a result, an increase in pressure loss can be suppressed.

Further, in the illustrated honeycomb structure 70, depths of the plugged portions 76, 77 of the cells B containing the magnetic substances in the cell extending direction gradually decreases from the center toward the outer circumference of the honeycomb structure 70. According to such a configuration, the heat generated by the induction heating is not easily blocked by the plugged portions 76, 77 on the outer side, and the honeycomb structure 70 is satisfactorily heated to the center. The form of gradually decreasing from the center toward the outer circumference of the honeycomb structure 70 is not particularly limited, and it can be appropriately designed. For example, the depths may preferably decrease at an equal proportion from the center to the outermost circumference of the honeycomb structure 70. In the illustrated honeycomb structure 70, the depths of the plugged portions 76, 77 of the cells B containing the magnetic substances in the cell extending direction gradually decrease from the center toward the outer circumference of the honeycomb structure 70 as described above, although not limited thereto. The depths of one or both of the plugged portions 19 of the cells A and the plugged portions 76, 77 of the cells B, which contain the magnetic substances, in the cell extending direction may gradually decrease from the center toward the outer circumference of the honeycomb structure 70. Further, the honeycomb structure 70 may be formed such that the depths of one or both of the plugged portions 19 of the cells A and the plugged portions 76, 77 of the cells B, which contain the magnetic substances, in the cell extending direction are changed from the center toward the outer circumference of the honeycomb structure 70 in order to match to a desired purpose as needed.

The method for producing the honeycomb structure 70 can be carried out in the same manner as that of the method for producing the honeycomb structure 60, with the exception that the plugged portions 76, 77 containing the magnetic substances are provided in the cell B in place of providing the magnetic substances on the surfaces in the cells 15. For the formation of the plugged portions 76, 77 of the honeycomb structure 70, for example, first, the magnetic substance 16 is mixed with a base material to obtain a material of the plugged portion 76, and the magnetic substance 17 is mixed with the base material to obtain a material of the plugged portion 77. The materials of the plugged portions 76, 77 are then arranged so as to be apart in order in the same cell B of the honeycomb dried body in the cell extending direction. Steps after the plugged portions are provided can be the same as those in Embodiment 6.

Embodiment 8

Figure 9A:
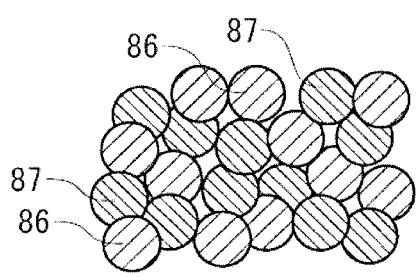
FIG. 9 (a) is a schematic external view of two different types of magnetic substances provided in cells of a honeycomb structure according to Embodiment 8 of the present invention.
FIG. 9(b) is a schematic appearance view of another form of two different types of magnetic substances provided in cells of a honeycomb structure according to Embodiment 8 of the present invention.
Figure 9B:
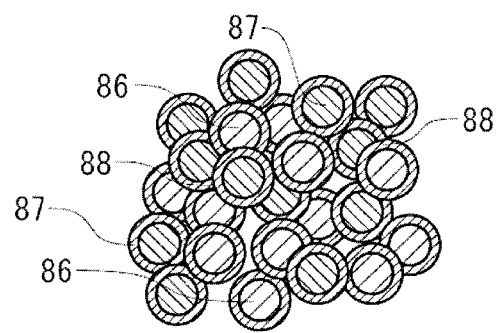

FIG. 9 (*a*) is a schematic external view of two different types of magnetic substances 86, 87 provided in cells 15 of a honeycomb structure according to Embodiment 8 of the present invention. FIG. 9(*b*) is a schematic appearance view of another form of two different types of magnetic substances 86, 87 provided in the cells 15 of the honeycomb structure according to Embodiment 8 of the present invention.

The two different types of magnetic substances 86, 87 provided in the cells 15 of the honeycomb structure according to Embodiment 8 are particles, respectively. Further, at least one type of the particles of the two different types of magnetic substances 86, 87 may be coated with a reaction prevention layer 88. In the honeycomb structure according to Embodiment 8, the particles of the two different magnetic substances 86, 87 are provided in the same cell 15. The particles of the two different types of magnetic substances 86, 87 may be filled in the cell 15, coated on the surfaces of the partition walls 12, or contained in the plugged portions 19.

The magnetic substances 86, 87 are different from each other in at least two of a maximum magnetic permeability, a Curie point, and an intrinsic resistance value. As the particles of the magnetic substances 86, 87, among the magnetic materials 16, 17 discussed in Embodiment 1, those that can be formed into particles can be used. According to such a configuration, the honeycomb structure according to Embodiment 8 contains two or more types of magnetic substances in which at least two of the maximum magnetic permeability, the Curie point, and the intrinsic resistance value are different in the cell 15, so that, as in Embodiment 1, both of a time required for heating to a temperature at which water evaporates and a time required for catalytic activity in the case of a filter having a supported catalyst are shorter, and carbon fine particles and the like can be burned out and removed by induction heating.

The reaction prevention layer 88 uses a material capable of covering the particle surfaces of the magnetic substances 86, 87 and suppressing the reaction of the magnetic substances 86, 87. Examples of the material of such a reaction prevention layer 88 include $SiO_2$-based materials. Specific examples include $SiO_2$—$Al_2O_3$—$MgO$, $SiO_2$—$Al_2O_3$, $SiO_2$—$MgO$, $SiO_2$—$SrO$, $SiO_2$—$CaO$, $SiO_2$—$CeO$, $SiO_2$—$ZrO_2$, $SiO_2$—$Y_2O_3$, $SiO_2$—$Y_2O_3$—$Yb_2O_3$, $SiO_2$—$La_2O_3$, and the like.

The method for producing the honeycomb structure according to Embodiment 8 can be carried out in the same manner as that of each of the methods for producing the honeycomb structures 50, 60, 70 discussed in Embodiments 5-7, with the exception that each of two different magnetic materials formed into particles is provided in the same cell 15.

<2. Exhaust Gas Purifying Device>

Figure 10:
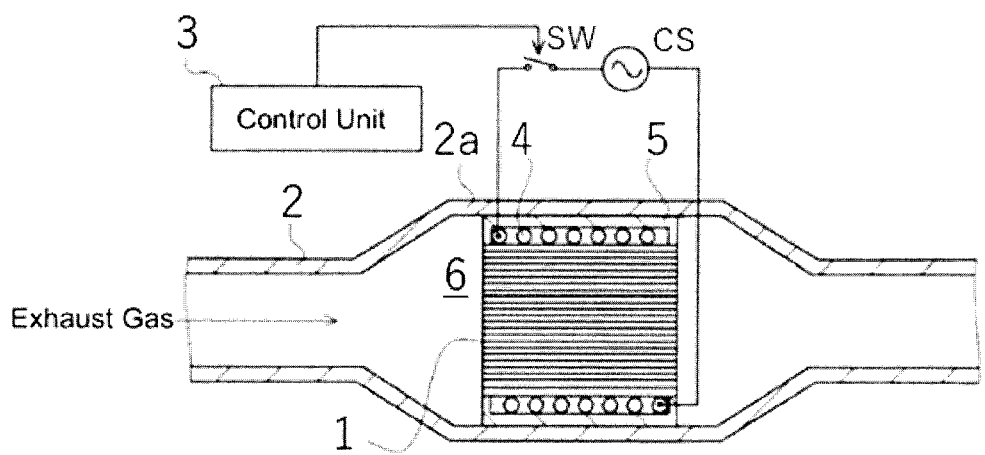
FIG. 10 is a schematic view of an exhaust gas flow path of an exhaust gas purifying device incorporating a honeycomb structure.

Using the honeycomb structure according to each embodiment of the present invention as described above, an exhaust gas purifying device can be formed. As an example, FIG. 10 shows a schematic view of an exhaust gas flow path of an exhaust gas purifying device 6 including the honeycomb structure 1. The exhaust gas purifying device 6 includes the honeycomb structure 1 and a coil wiring 4 that spirally surrounds the outer circumference of the honeycomb structure 1. Also, the exhaust gas purifying device 6 has a metal pipe 2 for housing the honeycomb structure 1 and the coil wiring 4. The exhaust gas purifying device 6 can be arranged in an increased diameter portion 2a of the metal pipe 2. The coil wiring 4 may be fixed to the interior of the metal pipe 2 by a fixing member 5. The fixing member 5 is preferably a heat-resistant member such as ceramic fibers. The honeycomb structure 1 may support a catalyst.

The coil wiring 4 is spirally wound around the outer circumference of the honeycomb structure 1. It is also assumed that two or more coil wirings 4 are used. An AC current supplied from an AC power supply CS flows through the coil wiring 4 in response to turning on (ON) of a switch SW, and as a result, a magnetic field that periodically changes is generated around the coil wiring 4. The on/off of the switch SW is controlled by a control unit 3. The control unit 3 can turn on the switch SW in synchronization with the start of an engine and pass an alternating current through the coil wiring 4. It is also assumed that the control unit 3 turns on the switch SW regardless of the start of the engine (for example, in response to an operation of a heating switch pushed by a driver).

In the present disclosure, a temperature of the honeycomb structure 1 is increased in response to the change of the magnetic field according to the alternating current flowing through the coil wiring 4. Based on this, carbon fine particles and the like collected by the honeycomb structure 1 are burned out. Also, when the honeycomb structure 1 supports the catalyst, the increase in the temperature of the honeycomb structure 1 raises a temperature of the catalyst supported by the catalyst support contained in the honeycomb structure 1 and promotes the catalytic reaction. Briefly, carbon monoxide (CO), nitrogen oxide ($NO_x$), and hydrocarbon (CH) are oxidized or reduced to carbon dioxide ($CO_2$), nitrogen ($N_2$), and water ($H_2O$).

EXAMPLES

Hereinafter, the present invention will be specifically described based on Examples. However, the present invention is not limited to Examples.

Example 1

A cylindrical cordierite honeycomb having a diameter of 82 mm, a length of 85 mm, a thickness of partition wall of 0.1 mm, and a distance between partition walls of about 1 mm was coated with magnetic substances in a partition wall of a single cell at intervals of 5×5 cells to form a honeycomb structure. For the cells coated with the magnetic substances, coating cells of the balance Fe-17% by mass of Cr powder and coating cells of the balance Fe-49% by mass of Co-2% by mass of V powder were alternately arranged. An amount of the magnetic substances coated was about 30 g.

Figure 11:
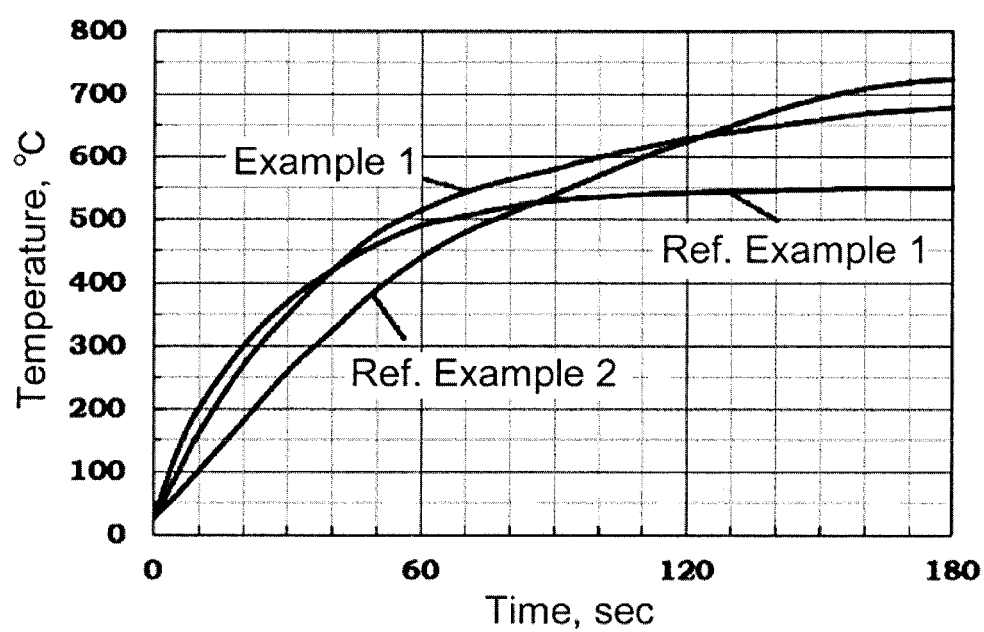
FIG. 11 is a graph showing an end face temperature of a honeycomb structure in an induction heating test at 500 kHz according to Example 1, Reference Examples 1 and 2.

Subsequently, a heating test of the honeycomb structure was conducted using an induction heating device, and a temperature of the end face of the honeycomb structure was measured with an infrared thermometer. The heating performances of the honeycomb structure were compared at an input power of 4 kW, and at an induction heating frequency of 500 kHz. A coil was circulated around the outer circumference of the honeycomb structure by three turns. An unloaded inductance of the coil was 1.0 µH. As a capacitor combined with the coil, a capacitor having a capacitance of 0.1 µF was selected. A transformer ratio was 7:1. FIG. 11 shows a graph showing a relationship between a time (seconds) and a temperature (° C.) at each induction heating frequency of 500 kHz in the heating test.

Reference Examples 1 and 2

The same cylindrical cordierite honeycombs as in Example 1 were prepared. Subsequently, in a partition wall of one cell at intervals of 5×5 cells, the balance Fe-17% by mass of Cr powder was coated for Reference Example 1, and the balance Fe-49% by mass of Co-2% by mass of V was coated for Reference Example 2, to obtain honeycomb structures. An amount of magnetic substance in each of the honeycomb structures according to Reference Examples 1 and 2 was about 30 g.

Subsequently, as in Example 1, a heating test of each honeycomb structure was conducted using an induction heating device. The results of measuring the temperature of the end face of each honeycomb structure with an infrared thermometer are shown in FIG. 11 together with those of Example 1.

Evaluation

The honeycomb structure according to Example 1 reached the catalyst activation temperature later than the honeycomb structure according to Reference Example 1, but the reached time of Example 1 was sufficiently earlier than the honeycomb structure according to Reference Example 2. Further, it could be confirmed that the honeycomb structure according to Reference Example 1 did not reach the combustion temperature of carbon fine particles of 600° C., whereas the honeycomb structure according to Example 1 was heated above 650° C., and the carbon fine particles could be burned and removed.

Example 2

Powder of the balance Fe-17% by mass of Cr having an average particle diameter of 10 µm and powder of 100% by mass of Co having an average particle diameter of 10 µm were pressed and fired at 1100° C. to obtain a balance Fe-17% by mass of Cr sintered body and a 100% Co sintered body, which had a density of 95% or more. Subsequently, square bars each having 1 mm×1 mm×25 mm were cut out from the sintered bodies to obtain two types of magnetic substances.

A rectangular honeycomb substrate having a size of 20 mm×12 mm×25 mm was cut out from a cordierite honeycomb having a partition wall thickness of 0.1 mm and a distance between partition walls of about 1 mm. In the honeycomb substrate, a cross section of 20×12 mm had 15 cells×9 cells. The square bar of the magnetic substance as described above was inserted every 5 cells×5 cells of those cells. That is, the magnetic substances were arranged at six positions in total: three positions×two positions. For the arrangement configuration of the magnetic substances, the magnetic substance that was the balance Fe-17% by mass of Cr sintered body and the magnetic substance that was the 100% Co sintered body were alternately arranged.

Subsequently, a heating test of the honeycomb structure was conducted using an induction heating device, and a temperature of the end face of the honeycomb structure was measured with an infrared thermometer. The heating performances of the honeycomb structure was compared at a voltage of 285V, a current of 15 A, and an induction heating frequency of 30 kHz. A coil was circulated around the outer circumference of the honeycomb structure by 9 turns.

Figure 12:
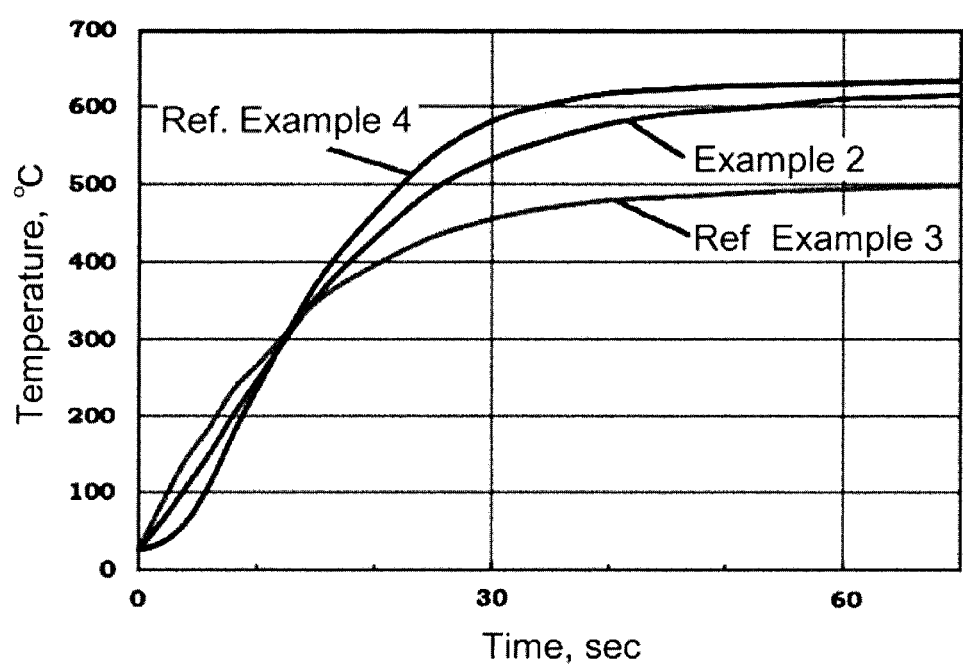
FIG. 12 is a graph showing an end face temperature of a honeycomb structure in an induction heating test at 30 kHz according to Example 2, Reference Examples 3 and 4.

FIG. 12 shows a graph showing a relationship between a time (seconds) and a temperature (° C.) at each induction heating frequency of 30 kHz in the heating test.

Reference Examples 3 and 4

The same rectangular cordierite honeycombs as in Example 2 were prepared.

Subsequently, as Reference Example 3, a magnetic square bar which was the balance Fe-17% by mass of Cr sintered body as described above was inserted every 5 cells×5 cells to form a honeycomb structure. That is, the same type of magnetic substance was arranged at six positions in total: three positions×two position.

Further, as Reference Example 4, the magnetic square bar which was the 100% by mass of Co sintered body as described above was inserted every 5 cells×5 cells. That is, the same type of magnetic material was arranged at six positions in total: three positions×two position.

Subsequently, as in Example 2, a heating test of each honeycomb structure was conducted using an induction heating device. The results of measuring the temperatures of the end faces of the honeycomb structures with an infrared thermometer are shown in FIG. 12 together with those of Example 2.

Evaluation

The honeycomb structure according to Reference Example 3 using only the balance Fe-17% by mass of Cr sintered body as the magnetic substance had a higher heating rate up to 300° C., and could rapidly increase a temperature by the induction heating up to evaporation of water and an active temperature of a catalyst, but it could not increase the temperature to 600° C., the combustion temperature of the carbon fine particles. On the other hand, the honeycomb structure according to Reference Example 4 where only the 100% by mass of Co sintered body was used as the magnetic substance could be heated to the combustion temperature of carbon fine particles of 600° C. or higher by induction heating, but it required times to increase the temperature to the evaporation temperature of water and catalyst activation temperature range. The honeycomb structure according to Example 2 where the balance Fe-17% by mass of Cr and 100% by mass of Co were alternately arranged as the magnetic substances could rapidly increase the temperature to the water evaporation temperature range and the catalyst activation range, and could increase the temperature to the combustion temperature of carbon fine particles of 600° C.

DESCRIPTION OF REFERENCE NUMERALS 1, 10, 20, 30, 40, 50, 60, 70 honeycomb structure
2 metal pipe
3 control unit
4 coil wiring
5 fixing member
6 exhaust gas purifying device
11 outer peripheral wall
12 partition wall
13, 14 end face
15 cells (cell A+cell B)
16, 17, 46, 47, 56, 57, 66, 67, 86, 87 magnetic substance
19, 36, 37, 76, 77 plugged portion
26, 27 permeable film
41 second cell
68, 88 reaction prevention layer

The invention claimed is:

1. A pillar shaped honeycomb structure, comprising:
an outer peripheral wall; and
a porous partition wall disposed inside the outer peripheral wall, the partition wall defining a plurality of cells, each of the cells extending from one end face to other end face to form a flow path,
wherein the plurality of cells include two or more types of magnetic substances in which at least two of a maximum magnetic permeability, a Curie point, and an intrinsic resistance value are different,
wherein at least one of the two or more types of magnetic substances has a Curie point of 700° C. or more,
wherein at least one of the two or more types of magnetic substances has a maximum magnetic permeability of 10,000 or more,
wherein the two or more types of magnetic substances are contained in the same cell,
wherein the two or more types of magnetic substances are independently for each type coated on the surface of the partition wall, and coatings of the independent magnetic substances are laminated in order in a normal direction in an extending direction of the cells; and
wherein a reaction prevention layer is provided between the coatings of the independent magnetic substances.

2. The honeycomb structure according to claim 1, wherein the cells comprise:
a plurality of cells A which are opened on the one end face side and have plugged portions on the other end face; and
a plurality of cells B which are arranged alternately with the cells A, and which are opened on the other end face side and have plugged portions on the one end face.

3. The honeycomb structure according to claim 1, wherein at least one of the two or more types of magnetic substances is wire-shaped.

4. The honeycomb structure according to claim 3, wherein each of the two or more types of magnetic substances is wire-shaped, and a surface of at least one wire-shaped magnetic substances is coated with a reaction prevention layer.

5. The honeycomb structure according to claim 1, wherein the cells comprise a plurality of first cells and a plurality of second cells having a cross-sectional area lower than that of the first cells; wherein the two or more types of magnetic substances are coated on the surface of each of the plurality of second cells; and wherein each of the second cells is arranged adjacent to at least one of the first cells.

6. The honeycomb structure according to claim 1,
wherein the two or more types of magnetic substances are two types of magnetic substances.

7. The honeycomb structure according to claim 1,
wherein the cells comprise: a plurality of cells A which are opened on the one end face side and have plugged portions on the other end face; and a plurality of cells B which are arranged alternately with the cells A, and which are opened on the other end face side and have plugged portions on the one end face; and
wherein a permeable film is provided between at least a part of the surface of the partition wall of the cells A and the cells B and the coatings of the magnetic substances.

8. The honeycomb structure according to claim 1,
wherein the cells comprise: a plurality of cells A which are opened on the one end face side and have plugged portions on the other end face; and a plurality of cells B which are arranged alternately with the cells A, and which are opened on the other end face side and have plugged portions on the one end face; and wherein one or both of the plugged portions of the cells A and the plugged portions of the cells B contains the two or more types of magnetic substances.

9. The honeycomb structure according to claim 1,
wherein the cells comprise: a plurality of cells A which are opened on the one end face side and have plugged portions on the other end face; and a plurality of cells B which are arranged alternately with the cells A, and which are opened on the other end face side and have plugged portions on the one end face; and wherein one or both of the plugged portions of the cells A and the plugged portions of the cells B contains the two or more types of magnetic substances; and wherein in the plugged portions containing the two or more types of magnetic substances, the two or more types of magnetic materialssubstances are provided independently for each type in an extending direction of the cells.

10. The honeycomb structure according to claim 1, wherein each of the two or more types of magnetic substances is particles, and at least one type of the particles of the two or more types of magnetic substances is coated with a reaction prevention layer.

11. The honeycomb structure according to claim 1, wherein at least one of the two or more types of magnetic substances has an intrinsic resistance value of 50 μΩcm or more.

12. The honeycomb structure according to claim 1, wherein the partition wall and the outer peripheral wall comprise a ceramic material, and the ceramic material is at least one selected from the group comprising cordierite, silicon carbide, aluminum titanate, silicon nitride, mullite, or alumina.

13. An exhaust gas purifying device, comprising:

the honeycomb structure according to claim 1;

a coil wiring that spirally surrounds an outer circumference of the honeycomb structure; and a metal pipe for housing the honeycomb structure and the coil wiring.

* * * * *